United States Patent [19]
Powell et al.

[11] Patent Number: 5,031,129
[45] Date of Patent: Jul. 9, 1991

[54] PARALLEL PSEUDO-RANDOM GENERATOR FOR EMULATING A SERIAL PSEUDO-RANDOM GENERATOR AND METHOD FOR CARRYING OUT SAME

[75] Inventors: William E. Powell, Raleigh; William B. Weeber, Apex, both of N.C.; Georges A. C. Roger, St. Michel sur Orge, France

[73] Assignee: Alcatel NA Network Systems Corp., Raleigh, N.C.

[21] Appl. No.: 351,175

[22] Filed: May 12, 1989

[51] Int. Cl.⁵ .............................................. G06F 1/02
[52] U.S. Cl. ................................................ 364/717
[58] Field of Search ..................................... 364/717

[56] References Cited

U.S. PATENT DOCUMENTS

| | | | |
|---|---|---|---|
| 3,920,894 | 11/1975 | Shirley et al. | 364/717 |
| 4,355,366 | 10/1982 | Porter | 364/717 |
| 4,511,988 | 4/1985 | Michel et al. | 364/717 |
| 4,769,777 | 9/1988 | Bittle et al. | 364/717 |
| 4,845,654 | 7/1989 | Harada et al. | 364/717 |
| 4,847,861 | 7/1989 | Hamatsu et al. | 364/717 |
| 4,864,525 | 9/1989 | Kurihara et al. | 364/717 |
| 4,912,666 | 3/1990 | Harada | 364/717 |
| 4,945,537 | 7/1990 | Harada | 364/717 |
| 4,959,832 | 9/1990 | Bardell, Jr. | 364/717 |

OTHER PUBLICATIONS

Peterson et al, *Error Correcting Codes*, MIT Press, Cambridge, Mass., 1975.
Roger, *Sequences Pseudo–Aleatoires*, Mar. 1989, Laboratoires de Marcoussis, Note Interne.
DeRusso et al, *State Variables for Engineers*, pp. 158–186, John Wiley & Sons, date unknown.
Vitesse Semiconductor Corporation AN5, Camarillo Calif., pp. 1–8.

*Primary Examiner*—Dale M. Shaw
*Attorney, Agent, or Firm*—Peter C. Van Der Sluys

[57] ABSTRACT

A parallel pseudo-random generator emulates a serial pseudo-random generator which in turn is defined by a polynomial of the type $1+x^M+ \ldots +x^P$; that is, wherein the serial outputs are generated such that the next serial output value is based upon an Exclusive OR combination of at least two preceding serial output values. The parallel pseudo-random generator comprises latches and Exclusive OR gates, the number of latches and Exclusive OR gates each being at least equal to the polynomial order of the serial pseudo-random generator defining polynomial. The outputs of the latches represent the outputs of the parallel pseudo-random generator and may be used to scramble data on parallel data lines. A method is disclosed for determining the interconnects between the latch outputs and the Exclusive OR gate inputs based upon the number of latches and the serial pseudo-random generator defining polynomial.

20 Claims, 6 Drawing Sheets

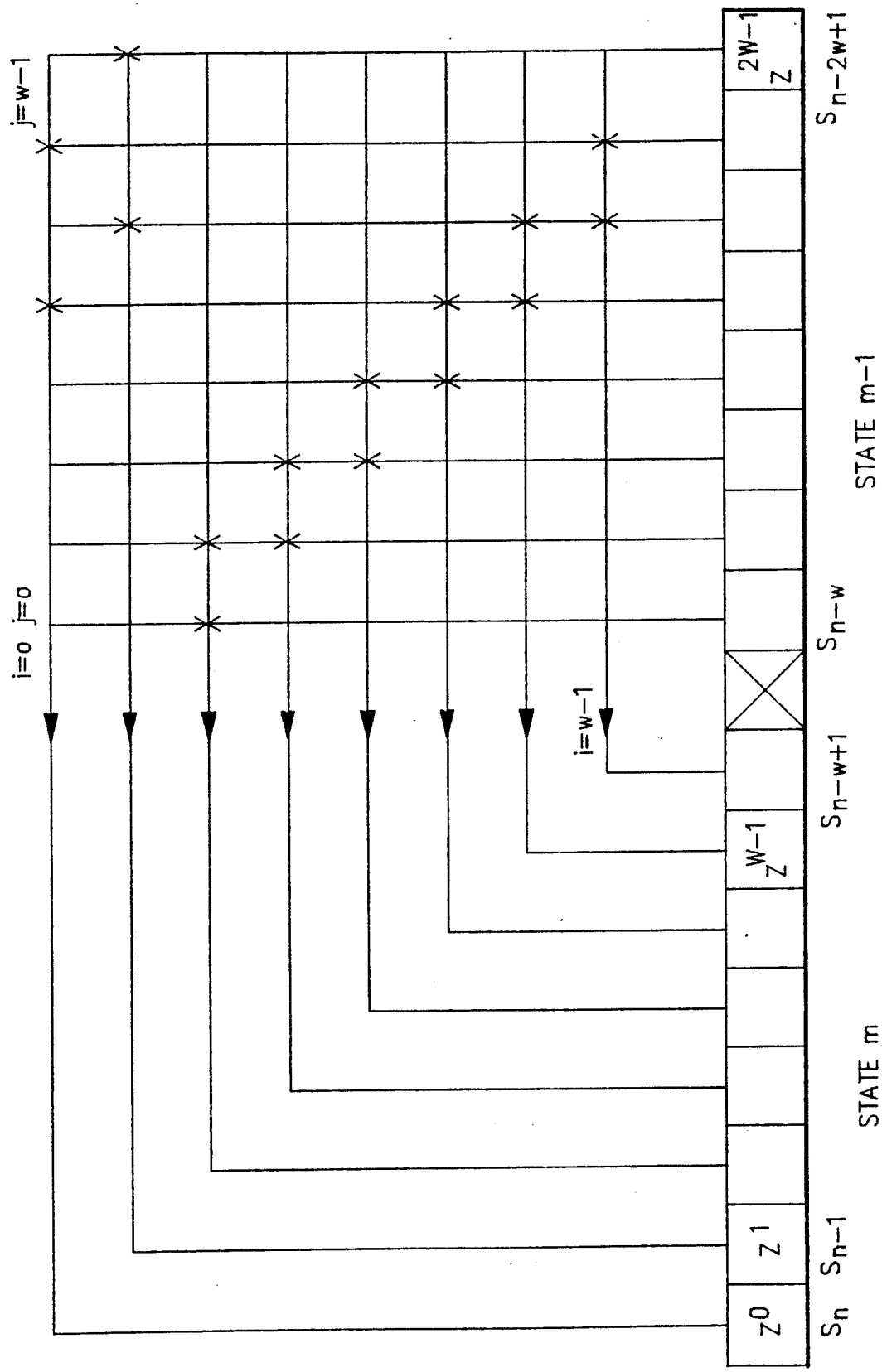

(1) SHIFT REGISTER

RELATIVE POSITION OF THE MATRIX ELEMENTS ('X')
AND OF POLYNOMIALS T(Z)=P(Z)Q(Z).
THE MATRIX IS IN THE PARALLELOGRAM $Q(n) \equiv Q(n+6) + Q(n+7)$ $Q(n) \equiv Q(n+2) + Q(n+5) + Q(n+9)$

PARALLEL PSEUDO-RANDOM GENERATOR FOR EMULATING A SERIAL PSEUDO-RANDOM GENERATOR AND METHOD FOR CARRYING OUT SAME

BACKGROUND OF THE INVENTION

1. Field of the Invention

The present invention relates to a circuit and associated method for emulating the output of a serial pseudo-random generator (PRG) or scrambler by a parallel implementation comprising a plurality of outputs which represent successive serial outputs of the serial PRG. The invention has particular use in telecommunications, where high speed data streams are combined with a serial PRG so as to insure proper clocking and for potential security of the data stream. Due to the high-speed nature of such telecommunication data, serial PRG's cannot be implemented using complimentary metal oxide silicon (CMOS) circuitry. Thus there is a need for emulating the serial PRG so that the clock rate of the circuitry is within the operating frequency of CMOS circuitry.

2. Description of the Related Art

Since the adoption of the synchronous optical network specification (SONET), a standard has been set for high-speed digital telecommunications (see American National Standards Institute, Inc. "Digital Hierarchy Optical Interface Rates and Formats Specification" standard TI.105—1988). Typically, such digital telecommunications combine a pseudo-random serial scrambling signal with the data stream so as to minimize the possibility of loss of clock signal which might otherwise result if the data stream comprised a large number of adjacent 0's or 1's. However, due to the fact that the serial data stream may operate at 155 megabits per second or higher, the serial PRG has to be implemented using high speed fabrication techniques, such as discrete emitter coupled logic (ECL) circuitry, ECL application specific integrated circuitry (ECL ASIC) or gallium arsenide (GaAs) circuitry, rather than the preferable CMOS circuitry which is less expensive to fabricate and operates at lower power than corresponding ECL or gallium arsenide circuitry. The additional fabrication costs and power requirements of ECL and GaAs circuitry also require more printed circuit board area in order to dissipate the additional heat, again making CMOS circuitry and especially CMOS application specific integrated circuitry (CMOS ASIC) preferable.

Due to the fact that CMOS circuitry cannot typically operate at clock speeds greater than 50 megahertz, it is necessary that a technique be used to effectively reduce the clock frequency of the serial pseudo-random generator. The present invention describes such a technique and circuit which is operable for any serial PRG generating polynomial, as well as for any size parallel output word larger than the length of the equivalent serial shift register, representing the successive outputs from the serial PRG.

In this manner, relatively low cost, low power consumption CMOS circuitry can be used to fabricate a parallel PRG which emulates the output of a serial PRG.

SUMMARY OF THE INVENTION

A parallel pseudo-random generator is described which emulates a serial pseudo-random generator which in turn operates upon a feedback arrangement wherein the next input value of the serial PRG is equal to the Exclusive-OR (XOR) combination of previous outputs of the serial PRG. For instance, in telecommunications, a typical scrambling polynomial is $1+x^6+x^7$. This polynomial means that the next input value of the serial PRG is equal to the output of the sixth preceding value of the generator, exclusively ORed with the seventh preceding value of the generator. The output of the seventh preceding value of the generator is also typically exclusive ORed with the data to be scrambled.

If the serial PRG has a clock rate of $f_s$, then the parallel PRG has a clock rate ($f_p$) of $f_s/W$, where W is the number of outputs of the parallel PRG.

The parallel PRG can be extended to any number of outputs (any size W) by choosing feedback paths which effectively emulate the serial PRG. The feedback paths are based upon the serial generating polynomial and the output size of the parallel PRG implementation. In two preferred embodiments of the present invention where W equals 8 and 16 respectively, corresponding numbers of D type flip-flops (FF) are used with Exclusive OR (XOR) gates which provide the necessary feedback for determining the values of the next W outputs corresponding to the next W successive values of the simulated serial PRG. These two implementations are optimized using an optimization criterion set to the minimum number of exclusive OR gates for simulating the serial pseudo-random generator.

OBJECTS OF THE INVENTION

It is therefore a principal object of the present invention to provide a parallel pseudo-random scrambler circuit and method for simulating the output of a serial pseudo-random generator, such that W parallel outputs emulate W successive output values of the serial pseudo-random generator.

Another object of the present invention is to provide a parallel PRG of the above description, wherein the value of W can be made arbitrarily large so that the resulting parallel clock frequency can be set arbitrarily low and therefore provide for implementation of a parallel PRG using CMOS fabrication techniques.

A still further object of the present invention is to provide a parallel PRG of the above description incorporating D type flip-flops in association with exclusive OR gates for providing the necessary feedback from the W outputs so as to determine the next W outputs.

A still further object of the present invention is to provide a parallel PRG of the above description which is implementable for any serial PRG generating polynomial.

Other objects of the present invention will in part be obvious and will in part appear hereinafter.

THE DRAWINGS

For a fuller understanding of the nature and objects of the present invention, reference should be made to the following detailed description taken in conjunction with the following drawings, in which:

FIG. 5A is a diagrammatic representation for a W output parallel PRG implementation of a serial pseudo-random generator shown in FIG. 5B, showing the feedback relationship between state m and state m−1.

BEST MODE FOR CARRYING OUT THE INVENTION

Figure 1:
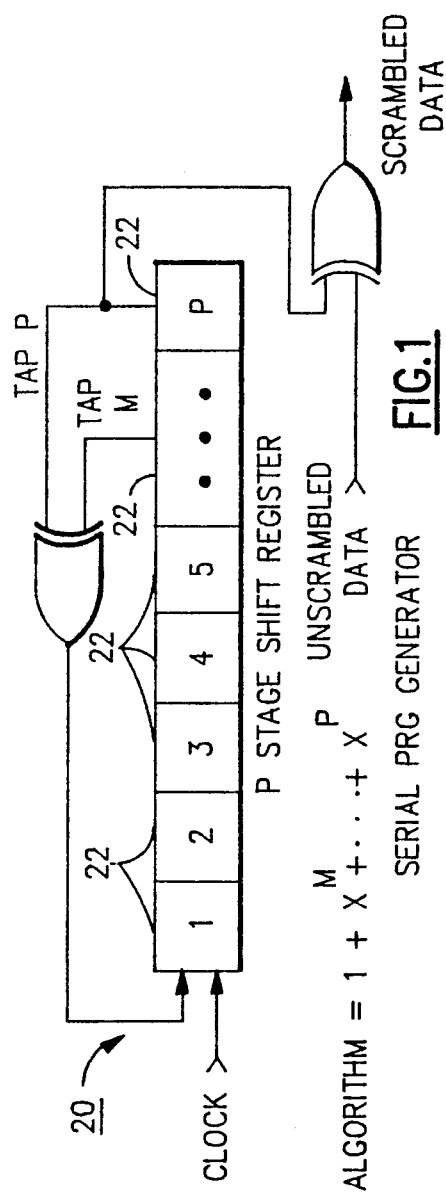
FIG. 1 is a diagram showing a serial pseudo-random generator incorporating use of D-type flip-flops connected as a P stage shift register, such that the next value generated is defined by the polynomial $1+X^M+X^P$.

There has traditionally been a need to use serial pseudo-random generators for scrambling telecommunication information. As shown in FIG. 1, a typical serial pseudo-random generator 20 (serial PRG) incorporates a plurality of stages arranged as a shift register 22 such that the value in each stage is transferred to the next stage until the last stage is encountered. The value in the last stage is typically Exclusive ORed (XOR) with one bit of the telecommunication data stream with the result of the XOR operation actually transmitted in the telecommunication application. An Exclusive OR operation is defined such that if both inputs are logic 1 or logic 0, then the output is logic 0 and if the inputs are respectively logic 1 and logic 0, or vice-versa, then the output is logic 1. A truth table representing an Exclusive OR operation is shown in Table 1.

TABLE 1

| Truth table for a two input EXCLUSIVE OR gate | | | |
|---|---|---|---|
| $X_1$ | $X_2$ | f | |
| 0 | 0 | 0 | where $X_1$, and $X_2$ are inputs, |
| 0 | 1 | 1 | and f is the output |
| 1 | 0 | 1 | (this is equivalent to modulo 2 |
| 1 | 1 | 0 | addition with no carries) |

The purpose of the pseudo-random generator in most telecommunication applications is to insure that regardless of the telecommunication bit stream pattern, the actual information transmitted will comprise approximately the same number of 1's and 0's. This result facilitates maintaining clocking information in the telecommunication bit stream which otherwise would be more difficult if, for instance, the telecommunication bit stream contained long, consecutive patterns of 1's or 0's. Such scrambling is also useful for data encryption.

Again referring to FIG. 1, it is seen that the operation of the serial pseudo-random generator can be defined by a polynomial typically of the nature $1+X^M+ \ldots +X^P$. This is known as the Characteristic Polynomial where "+" means the Exclusive OR operation (used in this manner throughout this document).

The feedback equation associated with this characteristic polynomial is derived as follows:

$$X^o + X^M + \ldots + X^P = 0$$

Then, $$X^0 + X^0 + X^M + \ldots + X^P = 0 + X^0$$

Since in general X+X=0 and 0+X=X where + is an Exclusive OR operation, then, $$X^M + \ldots + X^P = X^0$$

This last equation means that the next input value of the shift register is $X^M + \ldots + X^P$.

For instance in the synchronous optical network (SONET) standard (also known as the American National Standards Institute (ANSI) standard T1.105-1988), the polynomial is $1+X^6+X^7$. As seen in FIG. 1, this polynomial means that the value in shift register 6 is Exclusive ORed with the value in register 7 with the result being the next value in stage #1 of the P stage shift register. Table 4 shows the values in the seven stages where the starting value for each of the seven shift registers is logic 1. This starting value is typically called a "seed". For the SONET standard, the seed is typically all 1's for a serial PRG. As is seen, the values generated for stage 1 successively move down the stages of the shift register. As noted above, the output from stage 7 is also used for Exclusive ORing with the serial telecommunication bit stream.

The reason such a generator is called a pseudo-random generator is that the bit stream generated is always the same for the same starting seed and same polynomial.

Although the SONET polynomial used Exclusive OR's stage 6 and stage 7, other polynomials may of course be used in which different stages of the serial shift registers are Exclusive ORed together. In fact, more than two stages can be Exclusive ORed if desired.

Usually maximal length polynomials are used, that is, polynomials that repeat themselves after a maximum number of counts (clock cycles). For a maximal length polynomial the maximum number of counts is $2^n-1$ for an nth order polynomial. For example, for a polynomial of degree equal to three, a maximal polynomial is $1+X^2+X^3$, while a non-maximal polynomial is $1+X^1+X^2+X^3$. As seen in Tables 2 and 3, the maximal length polynomial repeats after seven outputs, while the non-maximal length polynomial repeats after four outputs.

The present invention is applicable with any serial polynomial, whether maximal or not.

TABLE 2

| polynomial of degree = 3 $X^2 + X^3$ (maximum length = $2^n - 1 = 2^3 - 1 = 8 - 1 = 7$) | | | |
|---|---|---|---|
| | Serial Stage # | | |
| (clock cycle) | 1 | 2 | 3 |
| 1 | 0 | 1 | 1 |
| 2 | 0 | 0 | 1 |
| 3 | 1 | 0 | 0 |
| 4 | 0 | 1 | 0 |
| 5 | 1 | 0 | 1 |
| 6 | 1 | 1 | 0 |
| 7 | 1 | 1 | 1 |
| 8 | 0 | 1 | 1 |

TABLE 2-continued polynomial of degree = 3
$X^2 + X^3$
(maximum length = $2^n - 1 = 2^3 - 1 = 8 - 1 = 7$)

| (clock cycle) | Serial Stage # | | |
|---|---|---|---|
| | 1 | 2 | 3 |
| 9 | etc. | | |

TABLE 3 polynomial of degree = 3
$X^1 + X^2 + X^3$

| (clock cycle) | Serial Stage # | | |
|---|---|---|---|
| | 1 | 2 | 3 |
| 1 | 0 | 1 | 1 |
| 2 | 0 | 0 | 1 |
| 3 | 1 | 0 | 0 |
| 4 | 1 | 1 | 0 |
| 5 | 0 | 1 | 1 |
| 6 | etc. | | |

Such a serial pseudo-random generator presents problems in integrated circuit implementation when the transmission rate of the telecommunication bit stream exceeds approximately 50 megabits per second. At speeds in excess of 50 megahertz per second, the fabrication of complimentary metal oxide silicon (CMOS) integrated circuitry becomes impractical. In fact CMOS fabrication at usable speeds exceeding approximately 75 megahertz is virtually impossible. As a result, for high transmission speeds such as those used in the SONET standard (such as 155 megabits per second), it is necessary if such a serial pseudo-random generator is to be used, that it be fabricated using emitter coupled logic (ECL) or gallium arsenide (GaAs) technology. Both these technologies have significant drawbacks as compared to CMOS technology in that they are typically more difficult to fabricate, and generate much more heat thereby requiring more printed circuit board area for placement of the integrated circuit components in order to dissipate the resulting heat, and cost more per logic gate.

The present invention provides a general solution to the generation of high-speed pseudo-random bit patterns by providing a parallel pseudo-random generator having a plurality of parallel outputs whose values represent successive outputs of the serial pseudo-random generator. Such a parallel pseudo-random generator 24 may have any desired number of parallel outputs with the example shown in FIG. 2 having 8 outputs and that shown in FIG. 4 having 16 outputs. The size of the parallel pseudo-random generator can be set to whatever value is best suited for a particular application, as long as the parallel word size is equal to or greater than the order of the scrambling polynomial. When using digital integrated circuitry the number of outputs generally has a value equal to a multiple of 2, such as 8 outputs, 16 outputs, etc.

Figure 2:
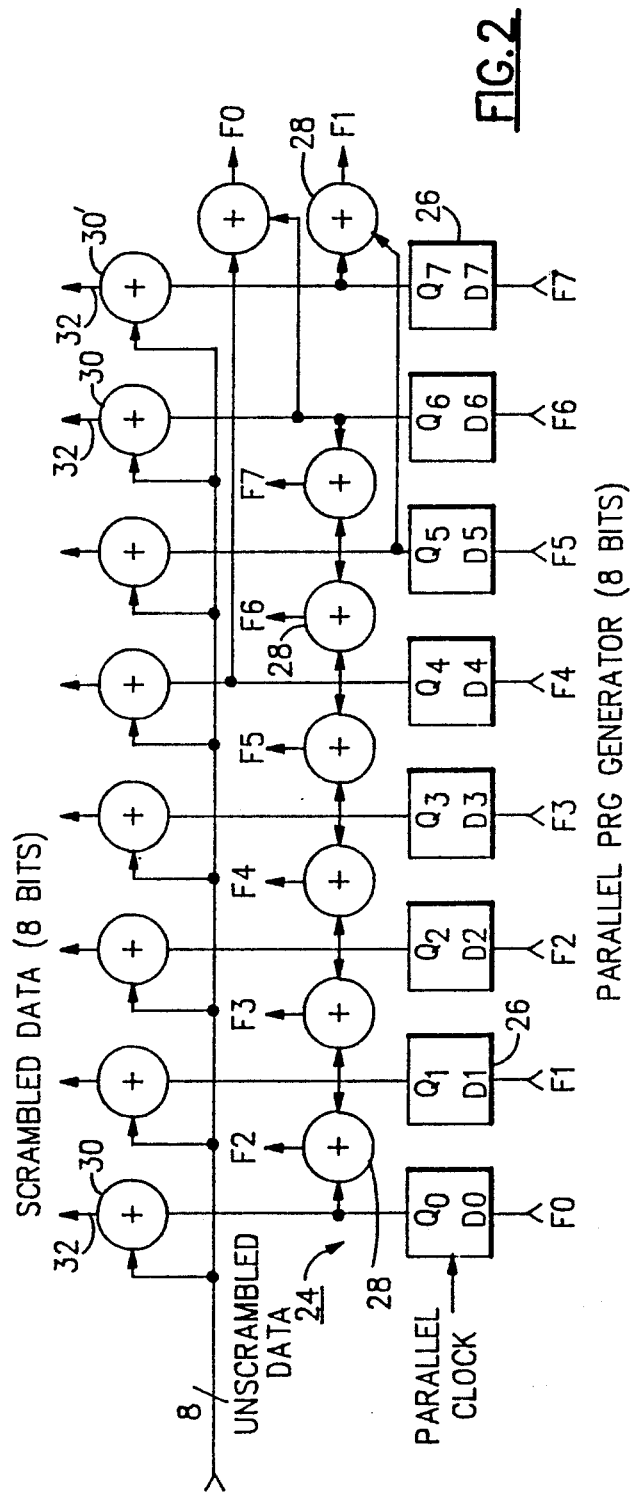
FIG. 2 is a block diagram showing an 8 bit parallel PRG for emulating the serial PRG shown in FIG. 5B.

In the example shown in FIG. 2, the pseudo-random generator comprises eight latches 26, which may be D type flip-flops, whose outputs (Q0 through Q7) represent eight successive output values of the emulated serial pseudo-random generator. Referring to Table 4 where the output of the serial pseudo-random generator is serial stage #7, it is seen that this seventh stage has logic value 1 for the first seven serial clock cycles (serial clock cycles 0-6) and has logic value 0 for the next clock cycle (serial clock cycle 7). Outputs Q7 through Q0 of the 8 bit parallel PRG therefore can represent these eight successive output values of stage 7 in the serial PRG as shown in Table 5. Thus it is seen in Table 5 that the Q0 output represents the eighth sequential output of this serial PRG output stage 7, Q1 represents the seventh serial output of stage 7, and in similar fashion, down to Q7, which represents the first sequential output of stage 7 of this serial PRG. This pattern repeats for each new parallel output.

As will be discussed in detail below, the next eight outputs of the parallel PRG from Q7 through Q0 have values 00000100. These values for Q7 through Q0 represent the next eight times sequential outputs of serial stage 7 as seen by comparing time outputs eight through fifteen of stage 7 presented in Table 4 with the parallel outputs for parallel clock cycle 1 (see Table 5). It is therefore seen that the initial zeroth frame of the parallel PRG corresponds to the first eight sequential outputs (serial clock cycles) of stage 7 of the serial PRG, that frame 1 of the parallel PRG corresponds to the next eight sequential outputs of stage 7 (serial clock cycles 8 through 15), etc. The initial parallel frame is the parallel seed input to the generator in order to start its operation in emulating the serial PRG which itself has a particular starting sequence or seed.

TABLE 4

Serial Pseudo-Random Generator
Corresponding to $1 + X^6 + X^7$ generating polynomial

| Time (equivalent serial) (clock cycles) | Serial Stage # | | | | | | | |
|---|---|---|---|---|---|---|---|---|
| | 1 | 2 | 3 | 4 | 5 | 6 | 7 | |
| 0 | 1 | 1 | 1 | 1 | 1 | 1 | 1 | --- | --- |
| 1 | 0 | 1 | 1 | 1 | 1 | 1 | 1 | |
| 2 | 0 | 0 | 1 | 1 | 1 | 1 | 1 | |
| 3 | 0 | 0 | 0 | 1 | 1 | 1 | 1 | parallel |
| 4 | 0 | 0 | 0 | 0 | 1 | 1 | 1 | frame 0 |
| 5 | 0 | 0 | 0 | 0 | 0 | 1 | 1 | (8 bit |
| 6 | 0 | 0 | 0 | 0 | 0 | 0 | 1 | version) |
| 7 | 1 | 0 | 0 | 0 | 0 | 0 | 0 | --- | parallel |
| 8 | 0 | 1 | 0 | 0 | 0 | 0 | 0 | --- | frame 0 |
| 9 | 0 | 0 | 1 | 0 | 0 | 0 | 0 | | (16 bit |
| 10 | 0 | 0 | 0 | 1 | 0 | 0 | 0 | | version |
| 11 | 0 | 0 | 0 | 0 | 1 | 0 | 0 | parallel |
| 12 | 0 | 0 | 0 | 0 | 0 | 1 | 0 | frame 1 |
| 13 | 1 | 0 | 0 | 0 | 0 | 0 | 1 | |
| 14 | 1 | 1 | 0 | 0 | 0 | 0 | 0 | |
| 15 | 0 | 1 | 1 | 0 | 0 | 0 | 0 | --- | --- |
| 16 | 0 | 0 | 1 | 1 | 0 | 0 | 0 | --- | --- |
| 17 | 0 | 0 | 0 | 1 | 1 | 0 | 0 | |
| 18 | 0 | 0 | 0 | 0 | 1 | 1 | 0 | |
| 19 | 1 | 0 | 0 | 0 | 0 | 1 | 1 | parallel |
| 20 | 0 | 1 | 0 | 0 | 0 | 0 | 1 | frame 2 |
| 21 | 1 | 0 | 1 | 0 | 0 | 0 | 0 | |
| 22 | 0 | 1 | 0 | 1 | 0 | 0 | 0 | |
| 23 | 0 | 0 | 1 | 0 | 1 | 0 | 0 | --- | parallel |
| 24 | 0 | 0 | 0 | 1 | 0 | 1 | 0 | --- | frame 1 |
| 25 | 1 | 0 | 0 | 0 | 1 | 0 | 1 | | (16 bit |
| 26 | 1 | 1 | 0 | 0 | 0 | 1 | 0 | parallel | version) |
| 27 | 1 | 1 | 1 | 0 | 0 | 0 | 1 | frame 3 |
| 28 | 1 | 1 | 1 | 1 | 0 | 0 | 0 | |
| 29 | 0 | 1 | 1 | 1 | 1 | 0 | 0 | |
| 30 | 0 | 0 | 1 | 1 | 1 | 1 | 0 | |
| 31 | 1 | 0 | 0 | 1 | 1 | 1 | 1 | --- | --- |
| 32 | 0 | 1 | 0 | 0 | 1 | 1 | 1 | --- | --- |
| 33 | 0 | 0 | 1 | 0 | 0 | 1 | 1 | |
| 34 | 0 | 0 | 0 | 1 | 0 | 0 | 1 | |
| 35 | 1 | 0 | 0 | 0 | 1 | 0 | 0 | parallel |
| 36 | 0 | 1 | 0 | 0 | 0 | 1 | 0 | frame 4 |
| 37 | 1 | 0 | 1 | 0 | 0 | 0 | 1 | | parallel |
| 38 | 1 | 1 | 0 | 1 | 0 | 0 | 0 | | frame 2 |
| 39 | 0 | 1 | 1 | 0 | 1 | 0 | 0 | --- | (16 bit |
| | | | | | | | | | version) |
| 40 | 0 | 0 | 1 | 1 | 0 | 1 | 0 | --- | |
| 41 | 1 | 0 | 0 | 1 | 1 | 0 | 1 | | |

TABLE 4-continued

Serial Pseudo-Random Generator
Corresponding to $1 + X^6 + X^7$ generating polynomial

| Time (equivalent serial) (clock cycles) | Serial Stage # | | | | | | | | |
|---|---|---|---|---|---|---|---|---|---|
| | 1 | 2 | 3 | 4 | 5 | 6 | 7 | | |
| 42 | 1 | 1 | 0 | 0 | 1 | 1 | 0 | | |
| 43 | 1 | 1 | 1 | 0 | 0 | 1 | 1 | parallel | parallel |
| 44 | 0 | 1 | 1 | 1 | 0 | 0 | 1 | frame 5 | frame 2 |
| 45 | 1 | 0 | 1 | 1 | 1 | 0 | 0 | | (16 bit |
| 46 | 0 | 1 | 0 | 1 | 1 | 1 | 0 | | vers. cont) |
| 47 | 1 | 0 | 1 | 0 | 1 | 1 | 1 | — | |
| 48 | 0 | 1 | 0 | 1 | 0 | 1 | 1 | — | |
| 49 | 0 | 0 | 1 | 0 | 1 | 0 | 1 | | |
| 50 | 1 | 0 | 0 | 1 | 0 | 1 | 0 | | |
| 51 | 1 | 1 | 0 | 0 | 1 | 0 | 1 | parallel | |
| 52 | 1 | 1 | 1 | 0 | 0 | 1 | 0 | frame 6 | |
| 53 | 1 | 1 | 1 | 1 | 0 | 0 | 1 | | |
| 54 | 1 | 1 | 1 | 1 | 1 | 0 | 0 | | |
| 55 | 0 | 1 | 1 | 1 | 1 | 1 | 0 | — | |

TABLE 5

Parallel Pseudo-Random Generator
(width = 8 bit) emulating
serial PRG corresponding to
$1 + X^6 + X^7$ generating polynomial

| Parallel clock cycle | Serial clock cycles | latest output Q0 | Q1 | Q2 | Q3 | Q4 | Q5 | Q6 | earliest output Q7 |
|---|---|---|---|---|---|---|---|---|---|
| 0 | 0–7 | 0 | 1 | 1 | 1 | 1 | 1 | 1 | 1 |
| 1 | 8–15 | 0 | 0 | 1 | 0 | 0 | 0 | 0 | 0 |
| 2 | 16–23 | 0 | 0 | 0 | 1 | 1 | 0 | 0 | 0 |
| 3 | 24–31 | 1 | 0 | 0 | 0 | 1 | 0 | 1 | 0 |
| 4 | 32–39 | 0 | 0 | 1 | 0 | 0 | 1 | 1 | 1 |
| 5 | 40–47 | 1 | 0 | 0 | 1 | 1 | 0 | 1 | 0 |
| 6 | 48–55 | 0 | 0 | 1 | 0 | 1 | 0 | 1 | 1 |

Analysis of the Parallel Implementation of Simulating a Serial PRG

Figure 3:
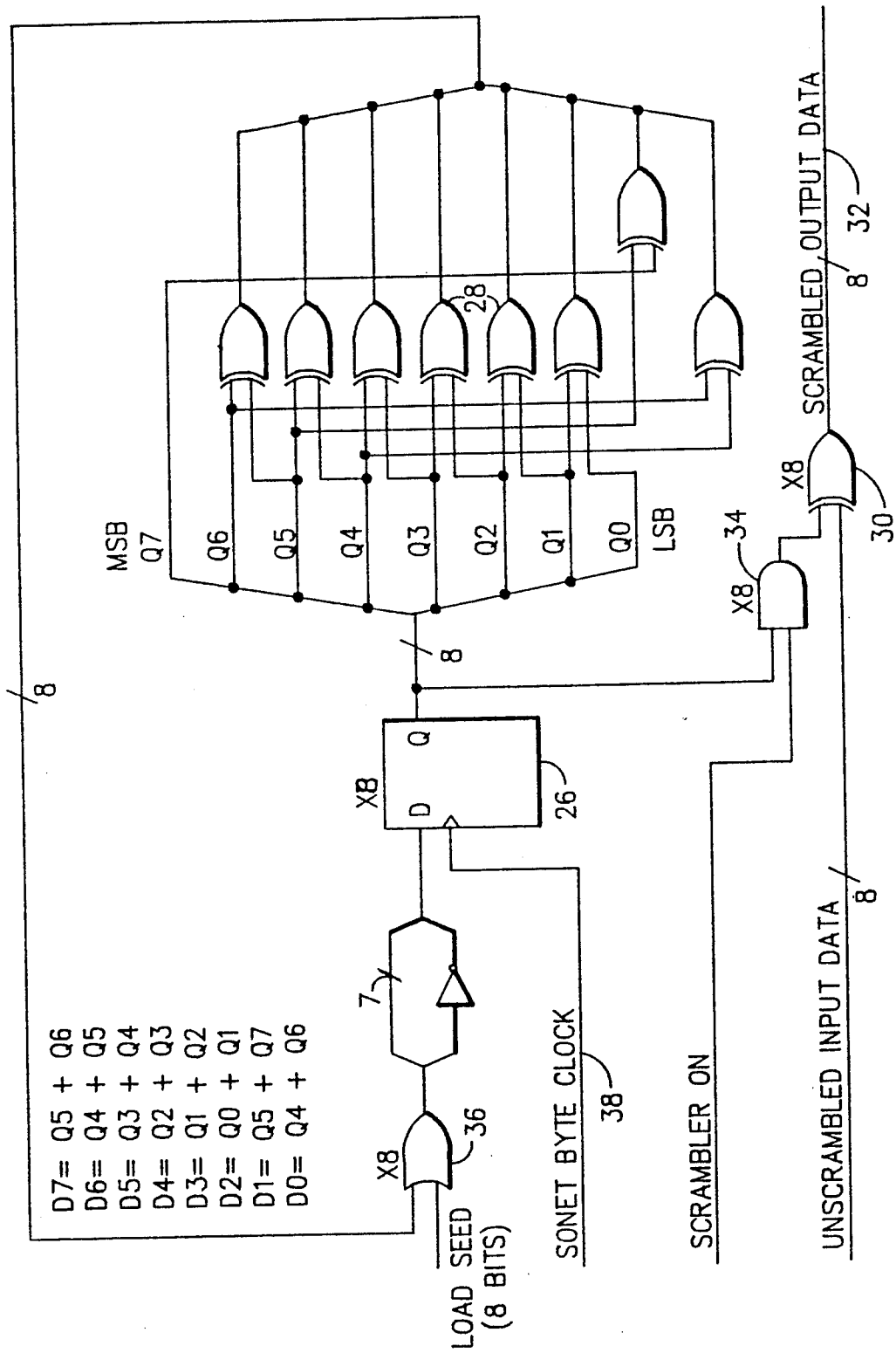
FIG. 3 is a schematic diagram of the 8 bit parallel PRG shown in FIG. 2, including clocking signals.

As seen in FIG. 2, in addition to latches 26, the parallel PRG further incorporates a plurality of Exclusive OR gates 28 which combine various outputs of the latches for presentation as inputs to the latches for generating the next outputs on the latches. FIG. 3 is a schematic diagram corresponding to FIG. 2 showing additional logic circuitry for enabling the generator (AND gates 34), for loading the parallel seed (OR gates 36), and for presentation of a parallel clock signal 38.

As seen in FIG. 2, the inputs D0 through D7 of the eight flip-flops, are presented with the values associated with functions F0 through F7. These functions are defined by the equations presented in Table 5A.

TABLE 5A

| F0 = Q4 + Q6 |
|---|
| F1 = Q5 + Q7 |
| F2 = Q0 + Q1 |
| F3 = Q1 + Q2 |
| F4 = Q2 + Q3 |
| F5 = Q3 + Q4 |
| F6 = Q4 + Q5 |
| F7 = Q5 + Q6 |

It is further noted in FIG. 2 that the outputs Q0 through Q7 of the parallel pseudo-random generator in turn are presented to a corresponding number of data stream output Exclusive OR gates 30 where the second input to each Exclusive OR gate is one bit of the serial data stream, such that the input to the Q7 Exclusive OR output gate 30' is Exclusive ORed with the first bit of the serial data, output Q6 is Exclusive ORed with the next serial bit of data, etc., through Q0 which is Exclusive Ored with the eight bit of serial data. The output signals on output lines 32 therefore represent the scrambled output data which can then be converted back to a serial bit stream through use of an 8 bit multiplexer (not shown).

It is readily seen in FIG. 2, that if the parallel pseudo-random generator has a width of 8 (W=8), that the frequency of the parallel operation is one-eighth that of the incoming serial bit stream since each parallel computation computes the next 8 outputs of this simulated serial pseudo-random generator as presented at outputs Q7 through Q0 respectively.

Determination of the Parallel Output Exclusive OR combinations

As will be presented more fully below, the determination of the Exclusive OR gate arrangement for presentation as an input to each of the parallel pseudo-random generator latch is determined in a manner so as to emulate the serial pseudo-random generator output bit stream. Although a particular Exclusive OR gate arrangement is shown in FIG. 2, there are in fact many implementations which are possible. The present invention is particularly advantageous when the minimum number of Exclusive OR gates are used for each input. This arrangement minimizes the requirements for serial gates and consequently minimizes the gate delays associated with each serial gate.

It has been experimentally found and mathematically verified as presented hereinafter in a mathematical analysis by inventor G. Roger entitled "Parallel Pseudo-Random Generator, Mathematical Analysis", that for any serial pseudo-random generator polynomials, there exists a solution by which Exclusive OR gates can be used to implement a parallel pseudo-random generator provided that the width of the parallel PRG is at least equal to the maximum shift register stage used to define the serial PRG polynomial.

Figure 7:
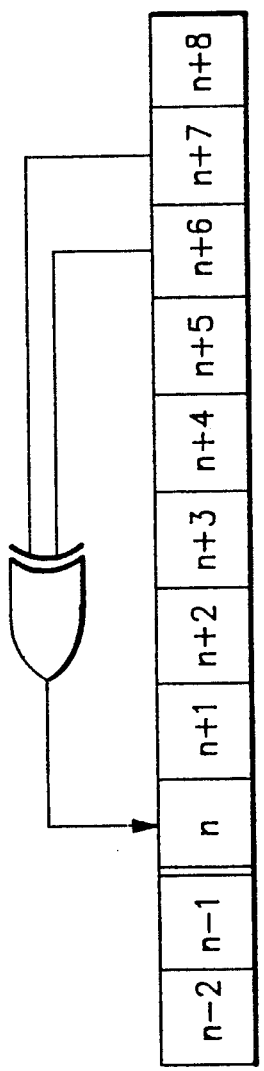
FIG. 7 is a diagram indicating the relationship between output (n) and the values of outputs (n+6) and output (n+7) for the polynomial $1+X^6+X^7$.

For the polynomial presented above with regard to FIG. 1, that is, wherein the next input to stage #1 is equal to the Exclusive OR output of stage 6 and 7, it is seen that this relationship can be defined generally as follows:

$$Q(n) \equiv Q(n+6) + Q(n+7) \qquad (1)$$

where "n" is any stage of the serial PRG. FIG. 7 shows a graphical representation of this relationship.

Again, referring to Table 4, it is seen that stages 6 and 7 for clock cycle 0 both have a logic 1 value. Consequently, the next value for stage 1 is equal to 0 (1+1=0, see Table 1). This result is analogous to the above formula where n equals 0 (Q(0) becomes Q(1) after the next serial clock cycle, and in general Q(n−1) becomes Q(n) after the next serial clock cycle).

In order to determine the next 8 bits of the emulating eight output parallel pseudo-random generator, it is observed that the next generated bit of the serial PRG will become, after eight serial clock cycles, the next value for output Q7 of the parallel PRG (see Table 6 where Q−1 becomes Q0 after one serial clock cycle; which becomes Q7 after seven additional serial clock cycles; where these eight serial clock cycles are equivalent to one parallel word clock cycle). Thus for the eight bit parallel PRG implementation, the next value for Q7 is equal to Q−1 which is equal to the Exclusive OR of Q5 and Q6, that is:
Next $Q7 = F7 = Q5 + Q6$.

Using this same rationale, it is seen that the next value of Q6 through Q2 can be defined as follows:
Next $Q6 = F6 = Q4 + Q5$
Next $Q5 = F5 = Q3 + Q4$
Next $Q4 = F4 = Q2 + Q3$
Next $Q3 = F3 = Q1 + Q2$
Next $Q2 = F2 = Q0 + Q1$ The evaluation of Q1 can also best be understood by reference to Table 6 and FIG. 7.

TABLE 6

| parallel output values for two eight bit words (from n = −8 to n = 7) | |
|---|---|
| Q−8 Q−7 Q−6 Q−5 Q−4 Q−3 Q−2 Q−1<br>next 8 bit word | Q0 Q1 Q2 Q3 Q4 Q5 Q6 Q7<br>present 8 bit word |

Thus the next value for Q1 (which equals F1) is equal to the value of Q−7.
Next $Q1 = F1 = Q-7$
from equation (1):

$$F1 = Q(-7+6) + Q(-7+7) = Q-1 + Q0 \; (n = -7)$$

but $Q-1 = Q5 + Q6 \; (n = -1)$ (using equation 1 again) therefore:
Next $Q1 = F1 = Q-1 + Q0 = Q5 + Q6 + Q0$ However, it is also seen from equation (1) that the present value of Q0 is equal to the present value of $Q6 + Q7 (Q0 = Q6 + Q7)$, and thus $$\text{Next } Q1 = F1 = Q5 + Q6 + Q6 + Q7 \tag{2}$$

Since the Exclusive OR of any logic value with itself is equal to 0 (see Table 1 above), equation (2) can be rewritten as follows:
Next $Q1 = F1 = Q5 + Q7$ Using the same rationale, it is readily seen that the next value of Q0 is defined as follows:
Next $Q0 = F0 = Q4 + Q6$ Therefore the essence of the procedure for determining the Exclusive OR gate arrangement is to determine through the serial generating polynomial, the inter-relationship between the serial stages. Since the parallel relationship merely displays a plurality of serial stages at the same time, then the serial polynomial is used to compute the next parallel output for each of the parallel outputs after W serial clock cycles, where W is equal to the width (i.e. number) of parallel outputs. Since only the present values of the parallel output stages are available for computing the next values of these same stages, if an output value is required from one or more of the next outputs (next word as shown in Table 6) of the parallel PRG, then the serial polynomial is again used for that particular output to determine the present outputs which represent that next output value. This procedure can be used with any parallel word size and for any serial generating polynomial.

Referring to Table 7, it is seen that for a 16 bit parallel PRG implementation, the next value of Q15 is simply equal to Q−1 (that is the serial output 16 serial clock pulses later) and thus;
Next $Q15 = F15 = Q-1 = Q5 + Q6$. (see equation (1) for $n = -1$)

TABLE 7

| Sixteen bit parallel PRG | |
|---|---|
| Q Q Q Q Q Q Q Q Q Q Q Q Q Q Q Q<br>−16 −15 −14 −13 −12 −11 −10 −9 −8 −7 −6 −5 −4 −3 −2 −1<br>NEXT 16 BIT WORD | Q Q Q Q Q Q Q Q Q Q Q Q Q Q Q Q<br>0 1 2 3 4 5 6 7 8 9 10 11 12 13 14 15<br>PRESENT 16 BIT WORD |

This analysis holds for the next values of Q14 through Q10, that is
Next $Q14 = F14 = Q4 + Q5$
Next $Q13 = F13 = Q3 + Q4$
Next $Q12 = F12 = Q2 + Q3$
Next $Q11 = F11 = Q1 + Q2$
Next $Q10 = F10 = Q0 + Q1$ It is seen that the next value of Q9 equals F9 which equals $Q-1 + Q0$. However, $Q-1$ is simply equal to $Q5 + Q6$ and thus
Next $Q9 = F9 = Q5 + Q6 + Q0$.

The present value of Q0 is, by equation (1), equal to $Q6 + Q7$ and thus:
Next $Q9 = F9 = Q5 + Q6 + Q6 + Q7$.
Next $Q9 = Q5 + Q7$ Similarly, for the next values of Q8 through Q4 are:
Next $Q8 = F8 = Q4 + Q6$
Next $Q7 = F7 = Q3 + Q5$
Next $Q6 = F6 = Q2 + Q4$
Next $Q5 = F5 = Q1 + Q3$
Next $Q4 = F4 = Q0 + Q2$ The next value of Q3 is equal to Q−13. Using equation (1) above, we have the following:
Next $Q3 = F3 = Q-13$
$Q-13 = Q-7 + Q-6 \; (n = -13)$
$Q-13 = (Q-1 + Q0) + (Q0 + Q1)$
$Q-13 = Q-1 + Q1$
$Q-13 = (Q5 + Q6) + Q1$ $$Q-13 = (Q5 + Q6) + (Q7 + Q8) \tag{2a}$$

but also from equation (1):
$Q5 = Q11 + Q12$
$Q6 = Q12 + Q13$
$Q7 = Q13 + Q14$
$Q8 = Q14 + Q15$
so therefore,
$Q-13 = (Q11 + Q12) + (Q12 + Q13) + (Q13 + Q14) + (Q14 + Q15)$
and therefore:

$$Q3 = Q11 + Q15. \tag{2b}$$

Similarly,
Next $Q2 = F2 = Q10 + Q14$,
Next $Q1 = F1 = Q9 + Q13$, and
Next $Q0 = F0 = Q8 + Q12$.

Figure 4:
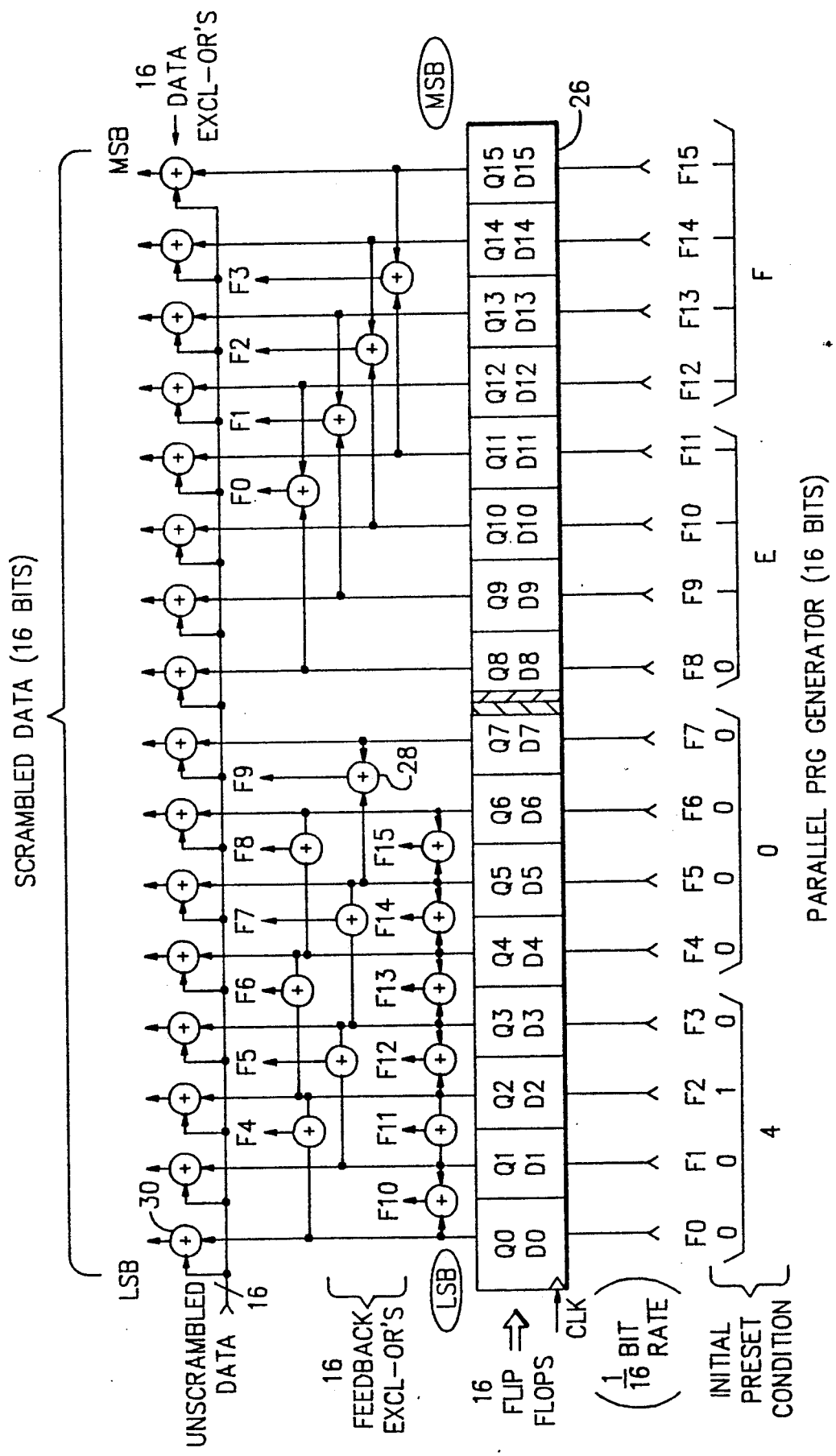
FIG. 4 is a block diagram of a 16 bit parallel PRG implementation of the serial PRG shown in FIG. 1.

The Exclusive OR implementation for the 16 bit parallel PRG is shown in FIG. 4 corresponding to the above analysis.

It is therefore seen that the next Q13 can be defined by a plurality of Exclusive OR operations such as shown by equations (2a) and (2b). In general such multiple representations can be shown for the outputs. One optimization criterion can be to use the minimum number of gate inputs, which is shown by equation (2b) for output Q3.

The above analysis can be used for any width parallel PRG provided that the width of the parallel PRG is at least equal to the maximum number of serial stages used in the feedback arrangement for the emulated serial PRG. In the example above, where the serial polynomial uses stages 6 and 7 to compute the next input stage, the value of P equals 7 and thus, the width of the parallel PRG must at least equal 7, although it may be any size greater.

Furthermore, although the serial polynomial was equal to the Exclusive OR of two serial stages, the present invention is applicable to any serial polynomial, regardless of the number of serial stages Exclusively ORed used to compute the next input.

An example of a more general serial pseudo-random generator is the following polynomials:

Next serial input $= X2 + X5 + X9$

That is, the characteristic polynomial is $1 + X^2 + X^5 + X^9$.

This polynomial is non-maximal (see Table 2 and 3 above) and is presented to demonstrate that the parallel PRG implementing methodology is general in application.

Figure 8:
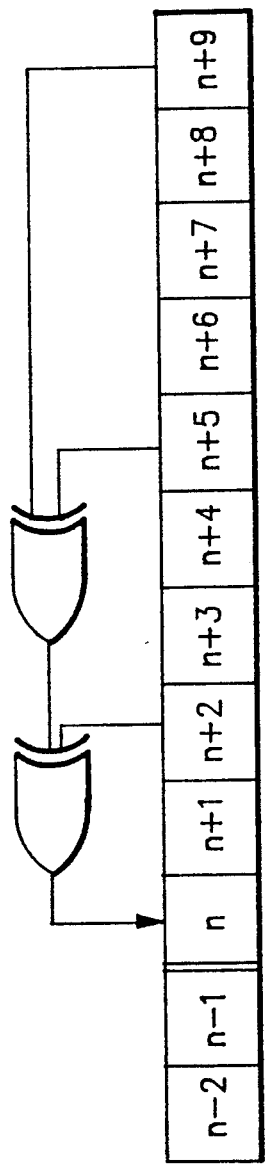
FIG. 8 is a diagram indicating the relationship between output (n) and the values of outputs (n+2), output (n+5) and output (n+9) for the polynomial $1+X^2+X^5+X^9$.

FIG. 8 diagrammatically shows this serial pseudo-random generator in terms regarding stage n, such that $$Q(n) \equiv Q(n+2) + Q(n+5) + Q(n+9). \quad (3)$$

Table 8 shows the serial stage values for the nine stages comprising the serial pseudo-random generator corresponding to this polynomial over 36 clock cycles (clock cycles 0-35).

TABLE 8

| Clock Cycle | Serial Polynomial = $1 + X^2 + X^5 + X^9$ |  |  |  |  |  |  |  |  |  |
|---|---|---|---|---|---|---|---|---|---|---|
|  | Serial Stage # |  |  |  |  |  |  |  |  |  |
|  | 1 | 2 | 3 | 4 | 5 | 6 | 7 | 8 | 9 |  |
| 0 | 0 | 1 | 1 | 1 | 1 | 1 | 1 | 1 | 1 | — |
| 1 | 1 | 0 | 1 | 1 | 1 | 1 | 1 | 1 | 1 |  |
| 2 | 0 | 1 | 0 | 1 | 1 | 1 | 1 | 1 | 1 |  |
| 3 | 1 | 0 | 1 | 0 | 1 | 1 | 1 | 1 | 1 |  |
| 4 | 0 | 1 | 0 | 1 | 0 | 1 | 1 | 1 | 1 | parallel |
| 5 | 0 | 0 | 1 | 0 | 1 | 0 | 1 | 1 | 1 | frame 0 |
| 6 | 0 | 0 | 0 | 1 | 0 | 1 | 0 | 1 | 1 | (9 bit version) |
| 7 | 1 | 0 | 0 | 0 | 1 | 0 | 1 | 0 | 1 |  |
| 8 | 0 | 1 | 0 | 0 | 0 | 1 | 0 | 1 | 0 | — |
| 9 | 1 | 0 | 1 | 0 | 0 | 0 | 1 | 0 | 1 | — |
| 10 | 1 | 1 | 0 | 1 | 0 | 0 | 0 | 1 | 0 |  |
| 11 | 1 | 1 | 1 | 0 | 1 | 0 | 0 | 0 | 1 |  |
| 12 | 1 | 1 | 1 | 1 | 0 | 1 | 0 | 0 | 0 |  |
| 13 | 1 | 1 | 1 | 1 | 1 | 0 | 1 | 0 | 0 | parallel |
| 14 | 0 | 1 | 1 | 1 | 1 | 1 | 0 | 1 | 0 | frame 1 |
| 15 | 0 | 0 | 1 | 1 | 1 | 1 | 1 | 0 | 1 |  |
| 16 | 0 | 0 | 0 | 1 | 1 | 1 | 1 | 1 | 0 |  |
| 17 | 1 | 0 | 0 | 0 | 1 | 1 | 1 | 1 | 1 | — |
| 18 | 0 | 1 | 0 | 0 | 0 | 1 | 1 | 1 | 1 | — |
| 19 | 0 | 0 | 1 | 0 | 0 | 0 | 1 | 1 | 1 |  |
| 20 | 1 | 0 | 0 | 1 | 0 | 0 | 0 | 1 | 1 |  |
| 21 | 1 | 1 | 0 | 0 | 1 | 0 | 0 | 0 | 1 |  |
| 22 | 1 | 1 | 1 | 0 | 0 | 1 | 0 | 0 | 0 | parallel |
| 23 | 1 | 1 | 1 | 1 | 0 | 0 | 1 | 0 | 0 | frame 2 |
| 24 | 1 | 1 | 1 | 1 | 1 | 0 | 0 | 1 | 0 |  |
| 25 | 0 | 1 | 1 | 1 | 1 | 1 | 0 | 0 | 1 |  |
| 26 | 1 | 0 | 1 | 1 | 1 | 1 | 1 | 0 | 0 | — |
| 27 | 1 | 1 | 0 | 1 | 1 | 1 | 1 | 1 | 0 | — |
| 28 | 0 | 1 | 1 | 0 | 1 | 1 | 1 | 1 | 1 |  |
| 29 | 1 | 0 | 1 | 1 | 0 | 1 | 1 | 1 | 1 |  |
| 30 | 1 | 1 | 0 | 1 | 1 | 0 | 1 | 1 | 1 |  |
| 31 | 1 | 1 | 1 | 0 | 1 | 1 | 0 | 1 | 1 | parallel |
| 32 | 1 | 1 | 1 | 1 | 0 | 1 | 1 | 0 | 1 | frame 3 |
| 33 | 0 | 1 | 1 | 1 | 1 | 0 | 1 | 1 | 0 |  |
| 34 | 0 | 0 | 1 | 1 | 1 | 1 | 0 | 1 | 1 |  |
| 35 | 0 | 0 | 0 | 1 | 1 | 1 | 1 | 0 | 1 | — |

By using the relationship in equation (3) the values for the next Q0 through Q8 outputs of a parallel pseudo-random generator with width W=9 emulating the serial pseudo-random generator shown in FIG. 8 are as follows:

$$\text{Next } Q8 = F8 = Q-1 = Q1 + Q4 + Q8$$
$$\text{Next } Q7 = F7 = Q-2 = Q0 + Q3 + Q7$$

$$\begin{aligned}
\text{Next } Q6 &= F6 = Q-3 = Q-1 + Q2 + Q6 \\
&= Q1 + Q4 + Q8 + Q2 + Q6 \\
&= Q1 + Q2 + Q4 + Q6 + Q8
\end{aligned}$$

$$\begin{aligned}
\text{Next } Q5 &= F5 = Q-4 = Q-2 + Q1 + Q5 \\
&= Q0 + Q3 + Q7 + Q1 + Q5 \\
&= Q0 + Q1 + Q3 + Q5 + Q7
\end{aligned}$$

$$\begin{aligned}
\text{Next } Q4 &= F4 = Q-5 = Q-3 + Q0 + Q4 \\
&= Q-1 + Q2 + Q6 + Q0 + Q4 \\
&= Q1 + Q4 + Q8 + Q2 + Q6 + Q0 + Q4 \\
&= Q1 + Q8 + Q2 + Q6 + Q0 \\
&= Q0 + Q1 + Q2 + Q6 + Q8
\end{aligned}$$

$$\begin{aligned}
\text{Next } Q3 &= F3 = Q-6 = Q-4 + Q-1 + Q3 \\
&= (Q-2 + Q1 + Q5) + (Q1 + Q4 + Q8) + Q3 \\
&= (Q0 + Q3 + Q7) + Q1 + Q5 + Q1 + Q4 + Q8 + Q3 \\
&= Q0 + Q7 + Q5 + Q4 + Q8 \\
&= Q0 + Q4 + Q5 + Q7 + Q8
\end{aligned}$$

-continued

Next $Q2$ = $F2 = Q-7 = Q-5 + Q-2 + Q2$
= $(Q-3 + Q0 + Q4) + (Q0 + Q3 + Q7) + Q2$
= $((Q-1 + Q2 + Q6) + Q0 + Q4) + (Q0 + Q3 + Q7) + Q2$
= $(((Q1 + Q4 + Q8) + Q2 + Q6) + Q0 + Q4) + (Q0 + Q3 + Q7) + Q2$
= $Q1 + Q8 + Q6 + Q3 + Q7$
= $Q1 + Q3 + Q6 + Q7 + Q8$ Next $Q1$ = $F1 = Q-8 = Q-6 + Q-3 + Q1$
= $(Q0 + Q7 + Q5 + Q4 + Q8) + (Q1 + Q4 + Q8 + Q2 + Q6) + Q1$
= $Q0 + Q7 + Q5 + Q2 + Q6$
= $Q0 + Q2 + Q5 + Q6 + Q7$ Next $Q0$ = $F0 = Q-9 = Q-7 + Q-4 + Q0$
= $(Q1 + Q8 + Q6 + Q3 + Q7) + (Q0 + Q3 + Q7 + Q1 + Q5) + Q0$
= $Q8 + Q6 + Q5$
= $Q5 + Q6 + Q8$ Table 9 shows the output values of the parallel pseudo-random generator for four parallel clock cycles corresponding to serial clock cycles 0 through 35. It is seen that these outputs correspond to the serial pseudo-random generator output stage 9 for the first 36 serial clock cycles.

TABLE 9

Parallel Pseudo-Random Generator (width = 9 bits) emulating serial PRG corresponding to $1 + X^2 + X^5 + X^9$ polynomial

| Parallel clock cycle | Serial clock cycles | latest Q0 | Q1 | Q2 | Q3 | Q4 | Q5 | Q6 | Q7 | earliest Q8 |
|---|---|---|---|---|---|---|---|---|---|---|
| 0 | 0-8 | 0 | 1 | 1 | 1 | 1 | 1 | 1 | 1 | 1 |
| 1 | 9-17 | 1 | 0 | 1 | 0 | 0 | 0 | 1 | 0 | 1 |
| 2 | 18-26 | 0 | 1 | 0 | 0 | 0 | 1 | 1 | 1 | 1 |
| 3 | 27-35 | 1 | 1 | 0 | 1 | 1 | 1 | 1 | 1 | 0 |

It is observed from the foregoing that as long as the width of the pseudo-random generator is at least equal to the number of stages used in the serial pseudo-random generator, the parallel pseudo-random generator is implementable. It is further seen that the minimum number of Exclusive OR gates necessary for implementing the parallel PRG is not necessarily equal to the number of Exclusive OR gates used in the corresponding serial PRG, at least when the parallel PRG has a width equal to the serial PRG.

The following mathematical analysis proves that there always exists a parallel PRG emulation of the serial PRG when the width of the parallel PRG is at least equal to the number of stages needed to implement the serial PRG polynomial.

Parallel Pseudo-Random Generator

Mathematical Analysis

1. Introduction

Figure 5B:
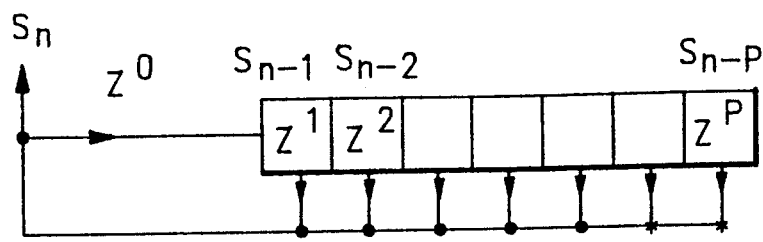
FIG. 5B is a diagrammatic representation of a serial PRG similar to that shown in FIG. 1, wherein stage P and stage P−1 are the feedback values used to determine the next value of stage 1.

A parallel pseudo-random generator is analyzed to replace a classical serial PRG generator built with shift registers. Both the parallel and serial generators are represented by the schematics diagrams shown in FIGS. 5A and 5B respectively.

In the classical solution, the signals issued from several stages of a p-stage shift register are added together by Exclusive OR (XOR) gates, and the input of the register is fed with the resulting signal, creating a feedback. The equation between the successive values of the signal is:

$$Sn = A1 Sn-1 + A2 Sn-2 + \ldots + Ap\, Sn-p \qquad (4)$$

in which '+' is used for XOR, or modulo 2 addition, and $A1, \ldots Ai, \ldots Ap$ are 1 if the output of the stage i is connected, or 0 if not. This is an equation whose coefficients are in the field of integers modulo 2 'F(0,1)2

The 'Z transform' of the signals leads to:

$$S(Z) = A1 Z^1 S(Z) + A2 Z^2 S(Z) + \ldots + Ap Z^p S(Z), \text{ or} \qquad (5)$$

$$P(Z) \cdot S(Z) = 0, \text{ with} \qquad (6)$$

$$P(Z) = Z^0 + A_1 Z^1 + A_2 Z^2 + \ldots + Ap Z^p. \qquad (7)$$

Equations 5 and 6 are equivalent.

P(Z) is the characteristic polynomial of S and may be considered a 'generator' of S.

If the polynomial P(Z) is 'irreducible and primitive' (is not a product of polynomials of smaller degrees with coefficients in F(0,1)), and has a primitive root of $Z^q + 1 = 0$ $(q = 2^p - 1)$, the sequence generated by the system will be a pseudo-random generator of period $2^p - 1$.

The parallel generator consists of a multi-output latch (e.g. a plurality of flip-flops), the input signals of which are computed by a network of XOR gates, this network being fed by the output signals of the latch.

2. Preliminary Remarks

These remarks may be useful to the reader unfamiliar with the methods of digital signal processing.

1) The field of 'integers modulo 2' contains only two elements, namely 0 and 1, with two operations; multiplication (AND) and addition (Exclusive OR, or XOR) such that:

$0 \times 0 = 0, 0 \times 1 = 1 \times 0, 1 \times 1 = 1$ and $0 + 0 = 0, 0 + 1 = 1 + 0 = 1, 1 + 1 = 0$ Polynomials with their coefficients in this field have properties such that: $P(Z) = Q(Z)$ is equivalent to $P(Z) + Q(Z) = 0$, or $(1 + Z)^2 = 1 + Z^2$ (because $2 = 0$).

2) We use a 'Z transform' such that if $S_n = S(nT)$ (T is a time interval)

$$S(Z) = \Sigma S_n Z^n$$

Z is a 'lag operator', because $$ZS(Z) + \Sigma S_n Z^{n+1} = \Sigma S_{n-1} Z^n,$$

which is the Z transform of S(t-T).

3) If we look for the solutions of:

$$S_n = A_1 S_{n-1} + A_2 S_{n-2} + \ldots + A_p S_{n-p} \text{ it is usual to}$$
$$\text{let: } S_n = Ca^{-n}, C \text{ being a constant.} \quad (5)$$

The equation becomes:

$$a^{-n} = A_1 a^{-n+1} + A_2 a^{-n+2} + \ldots + A_p a^{-n+p}, \text{ or}$$

$$a^0 + A_1 a + A_2 a^2 + \ldots + A_p a^p = 0$$

and we see that "a" must be a root of $P(Z) = 0$. There are p roots of this equation.

These roots generally cannot be expressed with 0 or 1, but a general solution of (5) will be a linear combination of the successive powers of them:

$$S_n = a_1^{-n} + a_2^{-n} + \ldots + a_p^{-n},$$

which is a symmetrical function of the roots of P(Z), therefore a function of the coefficients of P(Z), which are equal to 0 or 1, if these coefficients are on the field of the integers modulo2.

4) It is easy to see that the shift register of the serial PNS generator which contains p bits may contain at most $2^p$ words, including the word 0, 0, 0 . . . which generates a null sequence. Therefore, there may exist at most $2^p - 1$ non null words and the period of the sequence is at most $2^p - 1$. That period is obtained with particular polynomials called 'irreducible and primitive' polynomials.

5) If "a" is a root of $P(Z) = 0$.

$$P(a) = a^0 + A_1 a^1 + A_2 a^2 + \ldots$$
$$+ A_p a^p = P^2(a) = a^0 + A_1 a^2 + A_2 a^4 + \ldots + A_p a^{2p},$$

because $A_i = A_i$ and $a^2$ is another root of $P(Z) = 0$, as are a . . . $a^{2^P - 1}$, which are the p roots of the equation. The next one, with exponent $2^p$ is equal to "a" because $a^{2^P-1} = 1$.

3. THE PARALLEL GENERATOR

The 'Z equations' of the parallel generator of FIG. 5A are:

$$Z^0 = A_{00} Z^N + A_{01} Z^{N+1} + \ldots + A_{0,N-1} Z^{2N-1}$$

$$Z^1 = A_{10} Z^N + A_{11} Z^{N+1} + \ldots + A_{1,N-1} Z^{2N-1}$$

$$Z^i = A_{i0} Z^N + A_{i1} Z^{N+1} + \ldots + A_{i,N-1} Z^{2N-1}$$

$$Z^{N-1} = A_{N-1,0} Z^N + A_{N-1,1} Z^{N+1} + \ldots + A_{N-1,N-1} Z^{2N-1}$$

The matrix (the elements of which are $A_{1,j}$) is the transition matrix between two successive states m−1 and m of the latch. These coefficients are 1 or 0, following output j is linked or not to input i, generally through XOR circuits. For example, equation i corresponds to:

$$S_{n-i} = (A_{i0} S_{n-N}) XOR$$
$$(A_{i1} S_{n-N-1}) XOR (A_{i2} S_{n-N-2}) \ldots$$
$$XOR(A_{i,N-1} S_{n-2N+1})$$

Equation i may be written:

$$Z^i = \sum_{j=0}^{N-1} A_{ij} Z^{N+j} \text{ or } Z^0 = Z^{N-i} \sum_{j=0}^{N-1} A_{ij} Z^j = Z^{N-i} R_i(Z)$$

Ri is a polynomial, the coefficients of which are the elements of row i of the transition matrix.

$T_i(Z) = Z^0 + Z^{N-i} R_i$ (Z) must be such that $T_i(Z) \cdot S(Z) = 0$. We know that $P(Z) \cdot S(Z) = 0$, therefore, if T(Z) is a multiple of P, for example $T(Z) = P(Z) \cdot Q(Z)$, then $T(Z) \cdot S(Z) = P(Z) \cdot Q(Z) \cdot S(Z) = Q(Z) \cdot [P(Z) \cdot S(Z)] = 0$ (This result may be obtained by considering that successive values of S are combinations of powers of the roots of $P(Z) = 0$, which implies that $T(Z) = 0$ must have at least the same roots as $P(Z) = 0$). Suppose now that we consider a polynomial $P = A_0 + A_1 Z + A_2 Z^2 + A_3 Z^3$ (we take a particular example, easy to understand, but the derivation is general). The sequence generated by P(Z) is such that:

$$A_0 S_{n+3} + A_1 S_{n+2} + A_2 S_{n+1} + A_3 S_n = 0$$

$$A_0 S_{n+4} + A_1 S_{n+3} + A_2 S_{n+2} + A_3 S_{n+1} = 0$$

$$A_0 S_{n+5} + A_1 S_{n+4} + A_2 S_{n+3} + A_3 S_{n+2} = 0$$

Let $Q(Z) = B_0 + B_1 Z + B_2 Z^2$ then $T(Z) = P(Z) \cdot Q(Z) = A_0 B_0 + (A_0 B_1 + A_1 B_0) Z + (A_0 B_2 + A_1 B_1 + A_2 B_0) Z^2 + (A_1 B_2 + A_2 B_1 + A_3 B_0) Z^3 + (A_2 B_2 + A_3 B_1) Z^4 + A_3 B_2 Z^5$, or $T(Z) = C_0 + C_1 Z + C_2 Z^2 + C_3 Z^3 + C_4 Z^4 + C_5 Z^5$, If we compute, S' being a sequence: $C_0 S'_{n+5} + C_1 S'_{n+4} + \ldots + C_5 S'_n = A_0 B_0 S'_{n+5} + (A_0 B_1 + A_1 B_0) S'_{n+4} + \ldots$, we get: $B_0(A_0 S_{n+5} + A_1 S'_{n+4} + A_2 S_{n+3} + A_3 S'_{n+2}) + + B_1 (A_0 S'_{n+4} + A_1 S'_{n+3} + A_2 S'_{n+2} + A_3 S'_{n+1}) + + B_2(A_0 S'_{n+3} + A_1 S'_{n+2} + A_2 S'_{n+1} + A_3 S'_n)$ which is equal to 0 if S' is the sequence generated by P(Z). Furthermore, we see that if $S'_n, S'_{n+1}, S'_{n+3}, S'_{n+4}$ are successive values of S and if the computed sum is null, $S'_{n+5}$ is the following sample of S. We conclude that if T(Z) is a multiple of P(Z), 1) $T(Z) S(Z) = 0$, which was foreseen, and
2) T(Z) generates the sequence S, if it is fed with a 'good seed'. This result means a series of samples of the sequence S (with another seed, it could generate a sequence generated by Q).

T(Z) is such that only its first coefficient (always equal to 1), and its N last coefficients (those of $R_1$), may be different than zero. Therefore, the needed seed is limited to the samples contained in the latch. At the starting time, it is necessary that the latch be loaded with a section of the sequence generated by P(Z). Every polynomial $T_i(Z)$ generates a sample of the following series of bits of the latch, and for each clock time, the series of N bits located in the left part of the figure (state m) becomes the series located in the right part (state m−1), etc.

Figure 6:
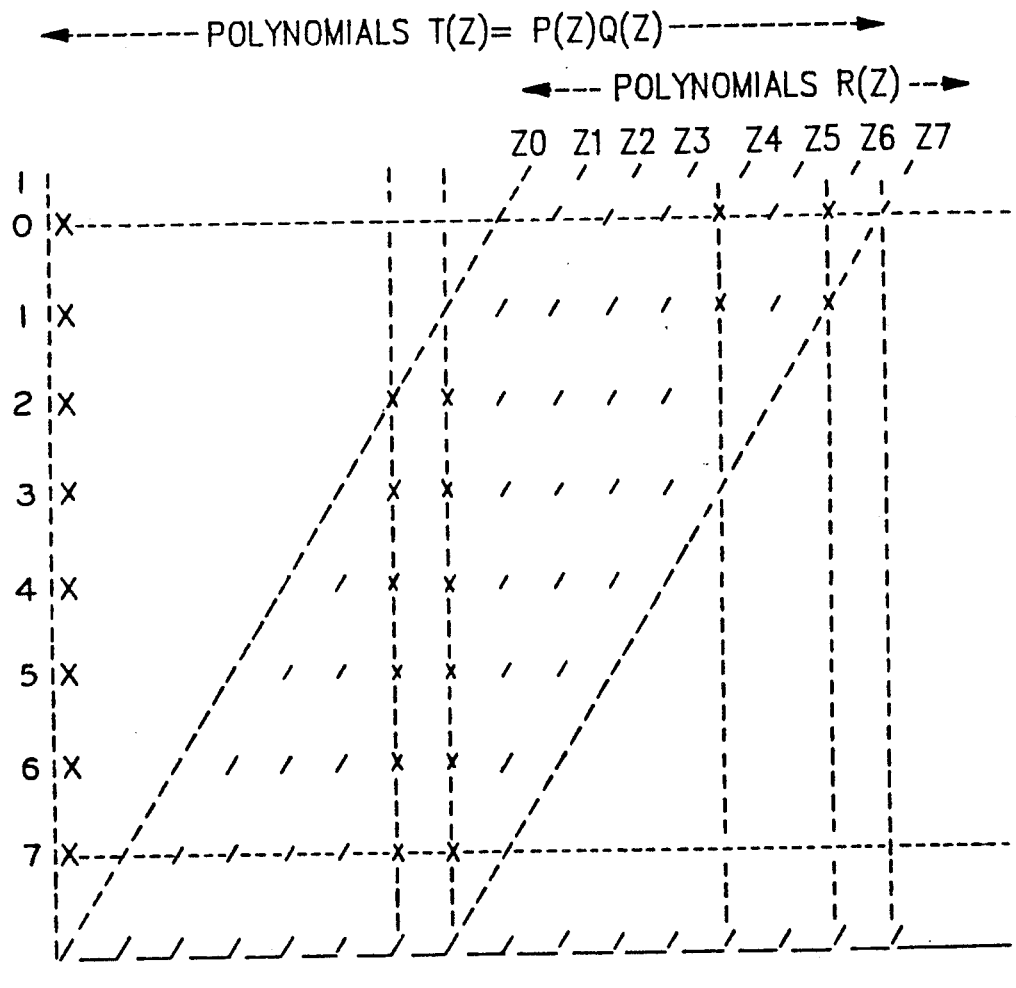
FIG. 6 is a transition matrix for the general solution of a parallel implementation of a serial pseudo-random generator corresponding to the parallel PRG shown in FIG. 5A.

FIG. 6 gives a picture of the coefficients of polynomials $T_i(Z)$. The coefficients equal to 1 are noted 'X', the others being equal to 0. The coefficients of $R_i$, which are the elements of the transition matrix, are inside a parallelogram, and we see that our problem is to find polynomials which:

1) are multiples of P(Z), or generators of the sequence generated by P(Z) (which is equivalent),
2) have their coefficients, other that the first one, included in the parallelogram, 3) have a minimum of terms equal to 1, in order to yield the simplest implementation.

The 'Bezout's Relation' (see Table 10) allows one to compute polynomials which fulfill the first two conditions, but not always the third condition.

A very simple method to find the 'good' polynomials is to 'try and see': for each line of the matrix, polynomials with two non-null coefficients included in the parallelogram. These polynomials are tested as generators of the sequence S and the first one being found is used and, if possible, reused for the next rows of the matrix. If searching with two coefficients fails, we look for three coefficients or more, etc.

Even though the polynomial is simple in nature, it may required tens of seconds of computing time (20 seconds (1) for a polynomial of the 12th degree and N=32, but virtually immediate results for a polynomial of the 7th degree and N=8 or 16) Note N here is equivalent to W; i.e., number of parallel outputs.

(1) With a D.E.C. VAX8600 Computer

4. Alternate Derivation a) The Characteristic Equations of the Parallel System Such a parallel generator may be represented by two successive states of the latch, linked by a transition matrix, the elements of which are 0 or 1, 1 meaning an XOR operation. So, each signal of the second state depends on the signals of the first one by:.

$$Z^i = \Sigma_j \, Bij \, Z^{j+N} \quad (8)$$

with $0 \leq i \leq N-1$ and $0 \leq j \leq N-1$, $Bij = 0$ or 1.

N is the number of bits contained in the latch and a series of N (N is equivalent to W as presented earlier) bits of the PRG are delivered for each parallel clock cycle instead of one bit with the shift register solution per serial clock cycle. Letting $k = N-i$, we may replace (8) by:

$$Z^{N-k} = Z^N \Sigma_j \, Bkj \, Z^j = Z^N Rk, \quad (9)$$

where
$Rk = \Sigma_k \, Bkj \, Z^j$ is a polynomial of the (N−1)th degree with Bkj coefficients and the kth (or N-i)th row of the matrix.

We replace equation (8) by:

$$Z^0 = 1 = Z^k Rk \quad (10)$$

or:

$$Sk(Z) = 1 + Z^k Rk = 0 \quad (11)$$

The equation $Sk(Z) = 0$ is a characteristic equation which must be fulfilled for every row k of the transition matrix, with $1 < k < N$.

b) Properties of the Characteristic Equation

The successive powers of the p roots of P(Z) are solutions of equation (4). The signals Sn are linear combinations of these powers, and are symmetrical functions of the roots of P(Z).

Therefore, to generate the same signals as the serial shift registers, the roots of Sk(Z) must include the roots of P(Z), and:

$$SK(Z) = P(Z) \, Qk(Z) \quad (12)$$

where Qk(Z) is a polynomial which must have at least a $Z^0$ term, since Sk and P have such a term.

Does the converse hold?

If equation (11): $Sk(Z) = P(Z) \, Qk(Z)$, then $Sk(Z) = 0$ is true not only for the roots of P(Z), but also for the roots of Qk (Z). There could be a problem with what are known as parasitic roots, but by choosing a 'good seed' (that is, a segment of the good PRG), we avoid introduction of such parasitic roots, as it may be proved, considering the successive values of Sn: if Sn, Sn−1, etc. are contained in the latch and are a segment of the PRG, Sn+1 will be a bit of the same PRG, and if Sn+1, Sn, Sn−1, ... are a segment of the PRG, then Sn+2 will be a bit of the PRG ..., etc.

So, every polynomial Sk(Z) must be a multiple of P(Z), starting with $Z^0$. Such a polynomial has other terms only between $Z^k$ and $Z^{k+N-1}$ (the terms of Rk), and conversely, such a polynomial is convenient for a parallel generator. There may be several equivalent expressions of Sk(Z) for the same value of k.

There may exist different expressions of Sk. For example, the following two polynoms may be valid:

$$Sk1(Z) = 1 + Z^k Rk1 = P(Z) Qk1(Z) \quad (13)$$

$$Sk2(Z) = 1 + Z^k Rk2 = P(Z) Qk2(Z) \quad (14)$$

The only condition is that degrees of Rk1 and Rk2 both be less than N.

By subtraction, we obtain:

$$Sk1 - Sk2 = Z^k(Rk1 - Rk2) = P(Z)(Qk1 - Qk2) \quad (15)$$

First the polynomial (Sk1−Sk2) is divided by P(Z). Sk1 and Sk2 are said to be 'congruent modulo P(Z)'. It means that Sk2 may be obtained by replacing terms of Sk1, with reference to P(Z).

For example, if $P(Z) = 1 + Z^6 + Z^7$, we may, in Sk1, replace Z by $Z^7 + Z^8$, because if $1 + Z^6 + Z^7 = 0$, $Z + Z^7 + Z^8 = 0$ also.

Second, as $Z^k$ cannot divide P(Z), which is a prime, without a null root, it divides (Qk1−Qk2). So (RK1−RK2) is also a multiple of P(Z) and Rk1 and Rk2 are also congruent modulo P(Z).

Thus there may exist, for the same row of the matrix, several polynomials Rk(Z), 'congruent modulo P (Z)', (with their degrees less than N), which give equivalent characteristic polynomials Sk(Z).

FIG. 6 shows several aspects of the problem:

1) There are two coordinate systems to take into account: one for the polynomials Sk, and one for the polynomials Rk, which must lie inside or on the edges of a parallelogram (from k=1 to k=8) and the allowed positions for 1 coefficients of the Rk are marked '/'.

2) In the example chosen, there are two interesting multiples of P(Z); namely, $1 + Z^6 + Z^7$ and $1 + Z^{12} + Z^{14}$, and we see that the non-constant terms of Sk may be non-constant terms of one of these multiples, if all of them are in the allowed domain.

3) Several polynomials Sk may be identical (S1 to S6 for example), and the corresponding Rk will differ only from a translation of terms.

c) The Bezout's Relation $$Sk(Z) = 1 + Z^k RK = P(Z) Qk(Z), \text{ or} \quad (16)$$

$$1 = Z^k Rk + P(Z)Qk(Z) \quad (17)$$

We recognize the BEZOUT's relation (see 'Relation of BEZOUT' later, Table 10):

if P(Z) and Q(Z) are two polynomials, their greatest common divider (GCD, or HCF—highest common factor—) may be expressed as:

$$HCF(P,Q) = A(Z)P(Z) + B(Z)Q(Z). \quad (18)$$

A and B can be found with a very simple algorithm, (derived from the Euclidean algorithm) and the degree of B is smaller than the degree of P.

$Z^k$ and P(Z) have no common factor (P is irreducible) so their HCF is 1, and equation (17) is the BEZOUT's relation.

So, for every value of k, we are able to determine a polynomial Rk, the degree of which is smaller than p, degree of P(Z). Taking k=1 in (17), we see that since $1 = Z R + P Q$, and since the degree of P Q is at least equal to p, and degree of R is at most equal to p, the unique possibility is degree of R=p−1, with degree of Q being 0. So, at least one of the polynomials Rk has p terms and the transition matrix must have at least p columns.

Therefore:
1) N must be at least equal to p (see discussion above concerning observed relationship between W (the same as N here) and P).
2) For N greater or equal to P, there is at least one solution to our problem.

That solution, in general, will not be optimum because we are typically looking for a minimum of XOR circuits. But if N>p−1, we shall have a way of improving the solution by searching polynomials Rk congruent modulo P(Z) with those given by the BEZOUT's relation, with the further condition that their degrees be less than N.

d) The 'Heuristic Solutions'

The heuristic solutions consist of searching systematically for the multiples of P(Z) having two, three, or more non-constant terms. If a two coefficient solution is found for the row k, it is used as much as possible for k+1, .... If three or more coefficients are needed, they are used only for the row k, because we may hope that the following row will accept less coefficients, and we start again with two coefficients. To test we divide by P(Z) and look to see if the remainder is the null polynomial. It may become expansive in computing time for high values of p and N, but it leads sooner or later to an optimum solution (there may be several solutions). We take the first one we find, at least at the present time.

Another way to test an Sk polynomial is to verify directly that the polynomial is able to generate the pseudo-random sequence generated by the given characteristic polynomial. This method is used in the program 'GSPA-E' (see Table 11 and the TEST portion of subroutine POLYANCOEFX).

Of course, other strategies are possible, depending on the objective. For example, it could be better to compute a table of the polynomials Sk able to fulfill the conditions, and pick among them to build the matrix.

Of course, such multiples as $(1+Z^6+Z^7)^{2^i}$ are evident as good.

In Summary

The problem is to know the multiples of P having a minimum of coefficients and pick among them those whose non-constant terms fall in the range of the Rk polynomials.

e) The Program

There are four parts to the program:
1) Initialization and input of the data:
   degree of the polynomial P(Z), p
   coefficients of P other than A0 and Ap (which are always 1)
   number of bits of the latch, N
   The PRG sequence corresponding to P(Z) is generated (Seq1), in order to:
   make sure that P is a 'good' polynomial
   prepare a good 'seed' for the test of the parallel system
   have a reference to test the parallel system.
2) Computation of the matrix elements
3) Publication of results
   a table of the coefficients of the matrix
   a drawing of the matrix, if N is no more than 32.
4) Verification
   a sequence (Seq2) is generated and compared to Seq1.

A file of subroutines is used with these programs. It contains all of the operations in modulo-2 algebra needed for our purpose.

Table 12 is a sample terminal listing from execution of the GPSA-E program.

Table 13 contains several printouts for 8, 16, 24, 32, and 64 bit parallel word widths of the SONET polynomial $(1+X^6+X^7)$.

f) Bibliography

Error Correcting Codes.
  W. Wesley Peterson and E. J. Weldon (MIT Press)
Error Correction Coding for Digital Communications.
  G. C. Clark and J. B. Cain (PLENUM)
Shift Register Sequences
  Solomon W. Golomb (Holden-Day, Inc.)
Sequences Pseudo-Aleatoires
  Georges C. Roger (Laboratories de Marcoussis, Note Interne)
State Variables for Engineers (John Wiley & Sons, Inc.)
  P. DeRusso, R. Roy and C. Close, pp 158-186.

TABLE 10

'Relation of Bezout'

We want to obtain the Highest Common Factor (HCF) of two integers, a and b, or of two polynomials. The algorithm is similar for both.

First, we divide a by b:
a = Q0 b + R1    0 ≤ R1 < b
The HCF, which divides a and b, divides R1. We divide now b by R1 etc ...
b = Q1   R1 + R2   Q ≤ R2 < R1
R1 = Q2  R2 + R3   Q ≤ R3 < R2
R is smaller and smaller. Therefore, it happens:

Rn−2 = Qn−1 + R̲n̲−1 + Rn (Rn is the HCF)

Rn−1 = Qn  R̲n̲ + Rn+1   with Rn+1=0 and Rn, which divides Rn−1, divides Rn−2 ..., a, and b.
Rn is the HCF of a and b. This is the Euclidean Algorithm.

Now consider the sequence of the successive remainders:

TABLE 10-continued

'Relation of Bezout'

$R1 = a - Q0\,b = A1\,a + B1\,b$, with $A1 = 1$
and $B1 = -Q0$
$R2 = b - Q1\,R1 = A2\,a + B2\,b$, $A2 = -Q1\,A1$,
$B2 = -Q1\,B1$
$R3 = R1 - Q2\,R2 = A3\,a + B3\,b$, $A3 = A1 - Q2\,A2$,
$B3 = B1 - Q2\,B2$ $Rn = An\,a + Bn\,b$, $An = An-2 - Qn-1\,An-1$,
$Bn = Bn-2 - Qn-1\,Bn-1$ Therefore, An and Bn are obtained from A1 at B1. If we set:
$A-1 = 1$, $B-1 = 0$, ($-1$ is a subscript), and $A0 = 0$ and $B0 = 1$,
the algorithm which yields Rn, An and Bn,
starting from subscript 1, is simple to implement.

If Rn is the HCF, we obtain the 'relation of Bezout':

$$HCF(a,b) = A\,a + A\,b$$

If a and b are coprime ('premiers entre eux' in french),
$Rn = HCF(a,b) = 1$. If a and b are polynomials, Rn is a constant,
which, if the coefficients are in F(0,1), is equal to 1,
and we obtain:

$$1 = a(Z)\,A(Z) + b(Z)\,B(Z)$$

It may be seen, or computed, that the degree of An is the
degree of the product: $Q1.Q2 \ldots Qn-1$, and for Bn,
it is the degree of $Q0.Q1 \ldots Qn-1$.
Furthermore: (°A means degree of polynomial A)

$°Q0 = °a - °b$
$°Q2 = °b - °R1$
$°Q2 = °R1 - °R2$ $°Qn-1 = °Rn-2 - °Rn-1$
$°Qn = °Rn-1 - °Rn$

Therefore, $°(Q0 . Q1 . Q2 \ldots Qn-1) = °a = °Rn-1$

If we suppose that a and b are coprime, and that Rn is their HCF,
$°Rn = 0$ and $°Rn-1$ is at least 1. Therefore, $°Bn$ is smaller
than $°a$, and by smaller reasoning, $°An$ is smaller than $°b$.

End of TABLE 10

It will thus be seen that the object set forth above and those made apparent from the preceding description are efficiently obtained, and since certain changes may be made in the above construction and methodology without departing from the scope of the parallel pseudo-random generator invention, it is intended that all matter contained in the above description or shown in the accompanying drawings shall be interpreted as illustrative and not in a limiting sense.

It is also to be understood that the following claims are intended to cover all of the generic and specific features of the parallel pseudo-random generator invention herein described, and all statements of the scope of the invention which, as a matter of language, might be said to fall therebetween.

TABLE 11

```
C ******** PROGRAM GPSA E **************
C ******** COMPUTATION OF THE TRANSITION MATRIX OF A PARALLEL GENERATOR ***
C ************ OF PSEUDORANDOM SEQUENCE ***************************
C ***********(G.ROGER.LABORATOIRES DE MARCOUSSIS.OCTOBER 9 1988)******
C                 FORTRAN-77 VAX VMS
C*** DECLARATIONS
C
      CHARACTER*3 NOM,REP
      CHARACTER*4 NOM4
      CHARACTER*75 LIGNE
      INTEGER DEG
      PARAMETER (DEG=130,NBRN=64,NBBITS=10000) !NBBITS POUR DEGRE<=12
C ** POLYNOMIALS LIMITED TO DEGREE 128.PARAMETERS MAY BE AJUSTED AS NEEDED.
C ** NBBITS IS AT LEAST TWICE THE NUMBER OF BITS OF THE P.N.S.
C ** P IS THE DEGREE OF THE CHARACTERISTIC POLYNOMIAL GIVEN FOR THE SERIES
C ** GENERATOR. P2 IS THE CHARACTERISTIC POLYNOMIAL ITSELF.
      INTEGER P,P1(DEG),P2(DEG),Q(DEG),R(DEG)
      INTEGER RN (NBRN,DEG)   ! THE TRANSITION MATRIX
      INTEGER A(DEG)
      INTEGER B(DEG)
      INTEGER SEQ1 (NBBITS),SEQ2(NBBITS)
C ** SEQ1 AND SEQ2 ARE TWO P.N.S.
C ***********************************
C **** INITIALISATIONS AND INPUT OF PARAMETERS *******
C ***************************************************
      IIDEG=DEG
      IUNIT1=6         !SECONDARY RESULTS  (FOR VERIFICATIONS)
      IUNIT2=6         !THE SCREEN
      IUNIT3=5         !THE KEABOARD
      IUNIT4=10        !IMPORTANT RESULTS (ON THE FILE GPSA.DAT)
      OPEN (UNIT=10,FILE='GPSA.DAT',STATUS='NEW')
      WRITE (IUNIT2,301)
      WRITE (IUNIT4,301)
```

```
301     FORMAT (//,' PARALLEL PSEUDONOISE SEQUENCIES GENERATOR.',/,
      C /,'       COMPUTATION OF THE TRANSITION MATRIX.( PROGRAM GPSA)',/,
      C '                   GEORGES ROGER L.D.M. 9/11/88',//)
C ************************************
C ************** INPUT OF PARAMETERS *********
C ************************************
10      WRITE (IUNIT2,1)
1       FORMAT (//,' 1) DEGREE OF THE CHARACTERISTIC POLYNOMIAL
      C (1<P<13)? ',$)
        READ (IUNIT3,2)P
2       FORMAT (I)
        IF (P.LT.2)THEN
        WRITE (IUNIT2,3)
3       FORMAT (' DEGREE TOO SMALL!')
        GO TO 10
        END IF
        IF (P.GT.12)THEN
        WRITE (IUNIT2,4)
4       FORMAT (' DEGREE TOO BIG!')
        GO TO 10
        END IF
        WRITE (IUNIT2,201)P
201     FORMAT (' DEGREE OF CHARACTERISTIC POLYNOMIAL: ',I2)
        CALL PNUL (DEG,P2)         ! CREATES THE CHARACT. POLYN. WITH
        P2(P+1)=1                  ! LAST AND
        P2(1)=1                    ! FIRST COEFFICIENTS (ALWAYS EQUAL TO 1)
        WRITE (IUNIT2,5)           ! THEN, ASKS FOR OTHER COEFFICIENTS:
5       FORMAT (/,'       INPUT OF THE CHARACTERISTIC POLYNOMIAL.',//,
      C ' POLYNOMIALSS ARE WRITTEN AS:',/,
      C '   X0 + A1 X1 + A2 X2 + .... + AP-1 XP-1 +XP',/,
      C '  PLEASE GIVE THE RANK OF COEFFICIENTS A1 TO AP-1 EQUAL TO 1,
      CONE AFTER THE OTHER.',/,
      C '   (THOSE OF DEGREE 0 AND P ARE  EQUAL TO  1 ALREADY)',/,
      C '   INPUT 0 TO INDICATE THE END OF THE OPERATION.',/)
20      CONTINUE
        WRITE (IUNIT2,7)
7       FORMAT (' RANK OF A COEFFICIENT EQUAL TO 1 ? ',$)
        READ (IUNIT3,8)II
8       FORMAT (I)
        IF (II.EQ.0) GO TO 25     ! MEANS THE END OF THE INPUT
        P2(II+1)=1                 ! TA0 IS IN P2(1), A1 IN P2(2)...
        GO TO 20                  !NEXT COEF. TO INPUT
25      CONTINUE                  !INPUT TERMINATED
C ********************
C ********** THE CHARACTERISTIC POLYNOMIAL HAS BEEN GIVEN. VERIFICATION:
C
        WRITE (IUNIT2,9500)
9500    FORMAT (/)
        CALL ECRIPOL (IUNIT2,'CHARACTERISTIC POLYNOMIAL:',DEG,P2,25,0)
C ---                           ** WRITES THE POLYNOMIAL **
        WRITE (IUNIT2,9)
9       FORMAT (/,' OK? :(RETURN=YES, IF NOT, INPUT: N ) ',$)
        REP=' '
        READ (IUNIT3,12)REP
12      FORMAT (A)
        IF ( REP(1:1).EQ.'N')GO TO 10   ! TO STARTING POINT
C ********** THE WISHED COEFFICIENTS WERE ENTERED. IS THE POLYNOMIAL CORRECT?
C ** ***** WE VERIFY THAT POLYNOMIAL P2 GENERATES A MAXIMUM P.N.S.
        CALL SEQUENCE (IUNIT2,DEG,P,P2,A,SEQ1,INDIC)    !COMPUTES THE P.N.S.
        IF (INDIC.EQ.1) THEN
        WRITE (6,19)
19      FORMAT (/,'   THE P.N.S. IS NOT MAXIMUM !!!')
        GO TO 10         ! TO STARTING POINT
        END IF
C ******* THE CHARACTERISTIC POLYNOMIAL IS GOOD ******
9000    CONTINUE
30      WRITE (IUNIT2,13)
13      FORMAT (/,' 2) NUMBER OF SIMULTANEOUS BITS  TO BE ISSUED
      C (N>P-1)? ',$)
        READ (IUNIT3,14)N
        IF (N.LT.P) GO TO 30     ! N MUST BE AT LEAST EQUAL TO P
```

```
14      FORMAT (I)
        WRITE (IUNIT2,9)           !OK?
        REP=' '
        READ (IUNIT3,12)REP
        IF ( REP(1:1).EQ.'N')GO TO 30
C *********************************
C       END OF PARAMETERS INPUT.
C *********************************
C *********************************
C
        WRITE (IUNIT2,9500)
        WRITE (IUNIT2,203)
203     FORMAT (X,'******************************')
        WRITE (IUNIT4,205) P
        WRITE (IUNIT2,205) P
205     FORMAT (' DEGREE OF CHARACTERISTIC POLYNOMIAL : ',I2,/)
        CALL ECRIPOL (IUNIT4,' CHARACTERISTIC POLYNOMIAL'
     C,DEG,P2,25,0)
        CALL ECRIPOL (IUNIT2,' CHARACTERISTIC POLYNOMIAL'
     C,DEG,P2,25,0)
        WRITE (IUNIT4,17)N
        WRITE (IUNIT2,17)N
17      FORMAT (/,' NB OF SIMULTANEOUS BITS: ',I3,/)
C *********************************************************
C *** PARAMETERS ARE NOW SUMMARIZED ON THE SCREEN AND PUT IN THE FILE.
C *********************************************************
C*********************************************************
C *** END OF INITIALISATIONS

C *********************************************************
C*********************************************************
        WRITE (IUNIT2,207)
207     FORMAT (/,X,' COMPUTING .....')
        WRITE (IUNIT2,203)
C ** LOOKING FOR THE SOLUTION **************
        KK=1       !FIRST LINE AT THE BOTTOM OF THE MATRIX
2000    CONTINUE
        IF (KK.GT.N)GO TO 2900   ! THE END
        IDEP=KK
        NBC=2     !NB DE COEFF DE ZK RK AUTRES QUE ZO
C ** WE LOOK FOR A POLYNOMIAL P1 MULTIPLE OF P2 AND HAVING ONLY
C ** NBC=TWO COEFFICIENTS BETWEEN KK AND KK+N-1,SUCH A POLYNOMIAL IS A
C ** GENERATOR OF THE P.N.S. SEQ1, ALREADY COMPUTED.
CZ      WRITE (IUNIT1,2001)KK,N+KK-1,NBC
2001    FORMAT (' KK= ',I3,'  N+KK-1= ',I3,'  NBC= ',I3)
        CALL POLYANCOEFX (DEG,P1,KK,N+KK-1,NBC,P2,INDICP,SEQ1)
CZ      IF (INDICP.EQ.1)WRITE (IUNIT1,2003)INDICP     ! FOR TEST OR DEBUGGING
2003    FORMAT (' INDICP= ',I3)
C ***************************************CAS OU NBC =2
        IF (INDICP.EQ.1) THEN    !SUCCESS
        P1(1)=0           !TO LOOK FOR THE DEGREE OF THE 1ST COEF OTHER THAN
C                         ! Z0, ALWAYS EQUAL TO 1
        CALL DEGDEB (P1,DEG,IDEGDEB,INDIC) !IDEGDEB=DEGREE OF THE FIRST COEFF
CZ      WRITE (IUNIT1,2005)IDEGDEB
2005    FORMAT (' IDEGDEB= ',I3)
C *********** P1 MAY BE USED UNTIL  K=IDEGDEB **********
C ** **** POLYNOMIAL P1 IS COPIED IN THE MATRIX RN WITH THE CORRECT SHIFT
        DO 2100 KK1=KK,IDEGDEB
        IF (KK1.GT.N) GO TO 2900        ! FINISHED
        DO 2200 LL=1,N  ! P1 COPIED IN RN
        RN (N-KK1+1,LL)=P1(LL+KK1)
2200    CONTINUE
        NOM4='RN  '
        WRITE (NOM4(3:4),'(I2.2)')N-KK1+1
        CALL ECRIPOLTAB (IDEG,NBRN,IUNIT4,NOM4,DEG,RN,N-KK1+1,70,0)
2100    CONTINUE
        KK=IDEGDEB+1
        GO TO 2000
        END IF          !IF INDICP=0, NOSUCCESS, WE TRY WITH 3, 4, ETC. COEFF
C *********************************************************
```

```
2300    CONTINUE
        NBC=NBC+1
C"      WRITE (IUNIT1,2001)KK,N+KK-1,NBC
        CALL POLYANCOEFX (DEG,P1,KK,N+KK-1,NBC,P2,INDICP,SEQ1)
C2      IF (INDICP.EQ.1)WRITE (IUNIT1,2003)INDICP
        IF (INDICP.EQ.1) THEN    !SUCCES
        DO 2250 LL=1,N
        RN (N-KK+1,LL)=P1(LL+KK)
225     CONTINUE                 ! P1 PUT IN RN
        NOM4='RN  '
        WRITE (NOM4(3:4),'(I2.2)')N-KK+1
        CALL ECRIPOLTAB (IIDEG,NBRN,IUNIT4,NOM4,DEG,RN,N-KK+1,70,0).
        KK=KK+1
        GO TO 2000       ! NEXT LINE OF THE MATRIX
        END IF           ! OR NOSUCCESS
        GO TO 2300       ! ONE MORE COEFF.
C
2900    CONTINUE
3000    CONTINUE
C ****** THE END ....
C ****************************************
C ************** END OF THE COMPUTATION **********
C ****************************************
C ***** WRITING THE MATRIX IN THE FILE ************
        WRITE (IUNIT4,607)CHAR (12) ! FORM FEED
        IF (N.GT.32) THEN
        WRITE (IUNIT4,611)
611     FORMAT (//,' MATRIX TOO BIG.UNABLE TO WRITE IT... ',//)
        GO TO 600
        END IF
607     FORMAT (X,A)
        WRITE (IUNIT4,9500)
        WRITE (IUNIT4,203)
        WRITE (IUNIT4,205) P
        CALL ECRIPOL (IUNIT4,' CHARACTERISTIC POLYNOMIAL ',
     CDEG,P2,25,0)
        WRITE (IUNIT4,17)N
        WRITE (IUNIT4,203)
        WRITE (IUNIT4,9500)
        WRITE (IUNIT4,601)
601     FORMAT (//,10X,'MATRIX:',/)
        IF (N.LE.24)KE=3
        IF (N.GT.24)KE=2
        WRITE (IUNIT4,605)((JJ-1)/10,JJ=1,N)
605     FORMAT (5X,<N>(I<KE-1>,X))
        WRITE (IUNIT4,603)(JJ-1-10*((JJ-1)/10),JJ=1,N)
603     FORMAT (5X,<N>(I<KE>),/)
        DO 600 II=1,N
        LIGNE=' '
        DO 610 JJ=1,N
        JJ1=KE*JJ
        IF (RN(II,JJ).EQ.0)LIGNE (JJ1:JJ1)='-'
        IF (RN(II,JJ).EQ.1)LIGNE (JJ1:JJ1)='+'
610     CONTINUE
        WRITE (IUNIT4,617)II-1,LIGNE
617     FORMAT (X,I2,2X,A75)
600     CONTINUE
        WRITE (IUNIT4,9500)
C ********* THE MATRIX IS WRITTEN
C
C ************** VERIFICATION ***********************
        IPERMAX=2**P-1
        NOMBREDEBITS=2*IPERMAX+100
C ************** VERIFICATION OF THE PARALLEL GENERATOR *******
C *** WE USE POLYNOMIAL 'A' FOR STATE  M AND 'B' FOR STATE M+1
C **  WE LOAD THE GENERATOR WITH THE FIRST P VALUES OF SEQ1
        DO 5000  II=1,N
5000    A(N-II+1)=SEQ1(II)       ! TAKE CARE OF THE TIME INCREASING DIRECTION!
C ***   WE NOW COMPUTE THE VALUES TO PUT INTO B:
C
```

```
              DO 5500 M=1,NOMBREDEBITS/N
              DO 5100 II=1,N
              B(II)=0
              DO 5200 JJ=1,N
              IF (RN(II,JJ).EQ.1) B(II)=B(II).XOR.A(JJ)
5200          CONTINUE
5100          CONTINUE
C **    WE PUT THE VALUES OF B IN SEQ2:
              DO 5300 II=1,N
              SEQ2((M-1)*N+II)=A(N-II+1)
5300          CONTINUE
C **    WE PUT THE VALUES OF B IN 'A' FOR THE FOLLOWING STATE:
              DO 5400 II=1,N
5400          A(II)=B(II)
5500          CONTINUE
C ************ END OF THE COMPUTATION OF SEQ2, OBTAINED WITH THE PARALLEL
C **    GENERATOR, AND COMPARISION WITH SEQ1, OBTAINED WITH A SERIES GENERATOR.
              WRITE (IUNIT1,4703)(SEQ1(KK),KK=1,72)
4703          FORMAT (' SEQ1:',X,72I1)
              WRITE (IUNIT1,5703)(SEQ2(KK),KK=1,72)
5703          FORMAT (' SEQ2:',X,72I1)
              DO 6000 II=1,2*IPERMAX
              IF (SEQ1(II).NE.SEQ2(II)) GO TO 6200
6000          CONTINUE
              WRITE (IUNIT4,6001)
6001          FORMAT (//,'    VERIFICATION O.K.   !!!')
              GO TO 10000
6200          WRITE (IUNIT4,6201)
6201          FORMAT (' THE P.N.S. ARE DIFFERENT. !!! SOMETHING WRONG.')
10000         CONTINUE
              WRITE (IUNIT2,209)
209           FORMAT (//,'    JOB TERMINATED.RESULTS IN GPSA.DAT',//)
              END
C***********************************************************************
              SUBROUTINE SEQUENCE (IUNIT,DEG,P,P2,A,SEQ1,INDIC)
C **    ON GENERE LA SEQUENCE QUE FOURNIRAIT LE SHIFT REGISTER A
C       DE P BASCULES ET DE POLYNOME CARACTERISTIQUE P2.
C  ---  DEUX PERIODES DE LA SEQUENCE MAXIMALE SONT RANGEES DANS SEQ1.
C       SI LA PERIODE N'EST PAS MAXIMALE, L'INDICATEUR EST MIS A 1
C       LES MESSAGES SONT ECRITS SUR IUNIT
C
C **    GENERATES THE SEQUENCE SEQ1 FURNISHED BY THE SHIFT REGISTER A,
C **    OF P STAGES AND CHARACTERISTIC POLYNOMIAL P2
C **    TWO PERIODS ARE COMPUTED. IF THE P.N.S. IS NOT MAXIMUM, INDIC=1
C **    MESSAGES ARE WRITTEN ON IUNIT1
              INTEGER DEG,P
              INTEGER  P2(1),A(1),SEQ1(1)
              INDIC=0
C **    LOADING 'A' WITH THE SEED
              CALL PNUL(DEG,A)
              DO 4100 II=2,P+1
4100          A(II)=1          ! DONE
C ********* ALGORITHM **************
              IPERMAX=2**P-1     ! PERIOD
              NOMBREDEBITS=2*IPERMAX+100    ! NOMBREDEBITS > 2 * IPERMAX -
              DO 4500 MM=1,NOMBREDEBITS     ! MORE THAN TWO PERIODS.
C ***   ON CALCULE L'ELEMENT QUI VA ENTRER DANS LE REGISTRE.C'EST A(1)
              A(1)=A(P+1)       ! ALWAYS CONNECTED
              DO 4200 II=2,P    ! IF A(II) CONNECTED...
              IF (P2(II).EQ.1) A(1)=A(1).XOR.A(II)
4200          CONTINUE
C **    COLLECTING THE ISSUED BIT AND SHIFTING
              SEQ1(MM)=A(P+1)   ! COLLECTING
              DO 4300 II=P+1,2,-1   ! SHIFTING
4300          A(II)=A(II-1)
4500          CONTINUE
C ******* ON VERIFIE LA PERIODE. PERIOD VERIFICATION.
              DO 4600 IPER=1,IPERMAX+1
              DO 4650 II=1,IPER+20
              IF (SEQ1(II+IPER).NE.SEQ1(II)) GO TO 4600
```

```
4650    CONTINUE
        GO TO 4700
4600    CONTINUE
4700    CONTINUE
        WRITE (IUNIT,4701)IPER,IPERMAX
4701    FORMAT (//,' PERIOD OF SEQ1: ',
      C I6,' MAX PERIOD : ',I6)
        WRITE (IUNIT,4703)(SEQ1(KK),KK=1,72)
4703    FORMAT (' SEQ1:',X,72I1)
        IF(IPER.NE.IPERMAX)INDIC=1
        RETURN
        END
C ************************************************************
C ************************************************************
C ******* POLY_2_OP.FOR ***************************************
C ************************************************************
C ** BIBLIOTHEQUE D'OPERATIONS SUR LES POLYNOMES DONT LES COEFFICIENTS SONT
C ** DES ENTIERS MODULO 2
C
C   LISTE DES SOUSROUTINES DE TRAITEMENT DE POLYNOMES A COEFFICIENTS
C   SUR LE CORPS (0,1)
C
C       LES POLYNOMES SONT ORDONNES PAR DEGRE CROISSANT
C
C       COPIE (DEG,P1,P2)              :RECOPIE P1 DANS P2
C       DEGRE (POL,DEG,DEGM,INDIC)     :DONNE LE DEGRE DE POL
C       DEGDEB (POL,DEG,DEGB,INDIC)    :DONNE LE PREMIER TERME NON NUL
C       PNUL (DEG,P)                   :CREE LE POLYNOME P IDENTIQUEMENT NUL
C       PUNIT (DEG,P)                  :CREE LE POLYNOME EGAL A 1
C       ECRIPOL (IUNIT,NOM,DEG,P,DEGMAX,INDIC)
C                                      :ECRIT LE POLYNOME P SUR L'UNITE IUNIT,
C                                       PRECEDE D'UN TITRE 'NOM', JUSQ'A DEGMAX
C                                       SI INDIC=0, LES TERMES SONT GROUPES
C                                       SI INDIC=1, LA PLACE DES TERMES NULS
C                                       EST REMPLACEE PAR DES BLANCS.
C       ECRIPOLTAB (IIDEG,NBRN,IUNIT,NOM,DEG,P,I,DEGMAX,INDIC)
C                                      :COMME ECRIPOL, MAIS POUR UN TABLEAU
C                                       DE POLYNOMES, DONT ON ECRIT LA LIGNE I.
C       POLYANCOEFX                    : CHERCHE LES MULTIPLES D'UN POLYNOME
C                                      : QUI ONT UN NOMBRE DONNE DE COEFFICIENTS
C************************************************************
C *** REMARQUES GENERALES. REMARKS.
C   LES POLYNOMES SONT TOUS ECRITS DANS UN VECTEUR A DEG POSITIONS
C   EN PARTANT DU DEGRE NUL.
C   POLYNOMIALS ARE WRITTEN IN AN ARRAY, STARTING FROM 0 DEGREE TERM.
C   LE DEGRE MAXIMAL TRAITABLE EST DONC DEG-1.ATTENTION AUX DEBORDEMENTS!!!
C   LES POLYNOMES AUXILIAIRES DONT LES DEGRES NE SONT PAS PASSES EN ARGUMENT
C   SONT DIMENSIONNES A 256.
C
C ************************************************
C ************************************************
        SUBROUTINE DEGRE (POL,DEGM,DEG,INDIC)
C DONNE LE DEGRE DU POLYNOME POL ECRIT DANS DEGM CELLULES
C ** DEGM=DEGRE MAX+1,DEG=DEGRE DU POLYNOME
C ** LOOKS FOR THE DEGREE OF THE POLYN.INDIC=1 IF THE POLYN. IS NULL
        INTEGER DEGM,DEG ,POL(1)
        INDIC=0
        DO 200 II=DEGM,1,-1
        IF (POL(II).EQ.1)GO TO 210
200     CONTINUE
        IF (POL(1).EQ.0) THEN
        DEG=-1                  !INDICATION DE DEGRE NUL
C       WRITE (6,1)
1       FORMAT (X,'DEGRE: POLYNOME IDENTIQUEMENT NUL')
        INDIC=1
C       GO TO 10000
        END IF
210     DEG=II-1
10000   CONTINUE
        RETURN
        END
```

```
C ************************************************
C ************************************************
      SUBROUTINE DEGDEB (POL,DEGM,DEGB,INDIC)
C ** DEGM=DEGREMAX,DEGB=DEGRE DU 1ER TERME DU POLYNOME
C ** INDIC=1 SI POLYNOME NUL
C ** LOOKS FOR THE FIRST TERM OF THE POLYN.
      INTEGER DEGM,DEGB ,POL(1)
      INDIC=0
      DO 200 II=1,DEGM
      IF (POL(II).EQ.1)GO TO 210
200   CONTINUE
      IF (POL(DEGM).EQ.0) THEN
C     WRITE (6,1)
1     FORMAT (X,'DEGDEB: POLYNOME IDENTIQUEMENT NUL')
      INDIC=1
C     GO TO 10000
      END IF
210   DEGB=II-1
10000 CONTINUE
      RETURN
      END
C ************************************************
C ************************************************
      SUBROUTINE COPIEX (DEG,P1,P2)
C ** RECOPIE P1 DANS P2 TERME A TERME.COPIES P1 INTO P2
      INTEGER DEG
      INTEGER P1(1),P2(1)
      DO 100 II=1,DEG
      P2(II)=P1(II)
100   CONTINUE
      RETURN
      END
C ************************************************
C ************************************************
      SUBROUTINE PNUL (DEG,P)
C ** CREE LE POLYNOME NUL DE DEGRE MAX DEG. CREATES THE NULL POLYNOMIAL
      INTEGER DEG
      INTEGER P(1)
      DO 100 II=1,DEG
100   P(II)=0
      RETURN
      END
C ************************************************
      SUBROUTINE PUNIT (DEG,P)
C ****** CREE LE POLYNOME DE DEGRE 0.CREATES THE CONSTANT POLYN. ******
      INTEGER DEG
      INTEGER P(1)
      CALL PNUL (DEG,P)
      P(1)=1
      RETURN
      END
C ************************************************
C ************************************************
      SUBROUTINE ECRIPOL (IUNIT,NOM,DEG,P,DEGMAX,INDIC)
C **   SI INDIC=0,TERMES BLOQUES,SI INDIC=1,ESPACES DE 4 BLANCS POUR CHAQUE
C **      TERME NUL
C ** IUNIT:L'UNITE LOGIQUE SUR LAQUELLE ON ECRIT.
C ** WRITES A POLYNOMIAL P. IF INDIC=0, NULL TERMS ARE DISCARDED.IF INDIC=1,
C ** FOUR BLANKS ARE LEFT FOR EACH BLANK TERM. DEGMAX LIMITS THE NUMBER OF
C ** WRITTEN TERMS. NOM IS THE NAME OF THE POLYNOMIAL, WHICH MAY BE WRITTEN.
      CHARACTER*(*)NOM
      CHARACTER*80    LIGNE
      INTEGER DEG,DEGMAX,DEGMAX1
      INTEGER P(1)
      CALL DEGRE (P,DEG,DEGMAX1,INDIC2)
      L=LEN (NOM)
      LIGNE=' '
      LIGNE (1:L)=NOM
      LIGNE (L+1:L+3)=' : '
      IDEP=L+4
```

```
C **********************************************
      DO 100 II=1,DEGMAX
      IF (P(II).EQ.0.AND.INDIC.EQ.1) GO TO 120        !ON SAUTE 4 BLANCS
      IF (P(II).EQ.1) THEN              !1
      LIGNE(IDEP:IDEP)='Z'
      IF ((II-1).LE.9)WRITE(LIGNE(IDEP+1:IDEP+1),'(I1)')II-1
      IF ((II-1).GT.9.AND.(II-1).LT.100)
C     WRITE(LIGNE(IDEP+1:IDEP+2),'(I2)')II-1
      IF ((II-1).GT.99.AND.(II-1).LT.1000)
C     WRITE(LIGNE(IDEP+1:IDEP+3),'(I3)')II-1
120   IDEP=IDEP+4
      IF((IDEP+8).GT.80) THEN           !2
      LIGNE(IDEP:IDEP+3)='....'
      WRITE (IUNIT,101)
101   FORMAT (X,' RESULT IS CUT')
      GO TO 1000
      END IF                            !2
      END IF                            !1
100   CONTINUE
1000  CONTINUE
C **********************************************
      WRITE (IUNIT,103)LIGNE
103   FORMAT (X,A80)
      RETURN
      END
C **********************************************
      SUBROUTINE ECRIPOLTAB (IIDEG,NBRN,IUNIT,NOM,DEG,P,I,DEGMAX,INDIC)
C *** ECRIT LE POLYNOME DE RANG I DU TABLEAU DE POLYNOMES P
C *** JUSQU'AU DEGRE DEG MAX
C ******** WRITES A POLYNOMIAL OF RANK I, TAKEN IN A TABLE OF POLYNOMIALS
      CHARACTER*(*)NOM
      CHARACTER*80    LIGNE
      INTEGER DEG,DEGMAX,DEGMAX1
      INTEGER P(NBRN,IIDEG),A (300)
      DO 10 II=1,DEG
10    A(II)=P(I,II)
      CALL ECRIPOL (IUNIT,NOM,DEG,A,DEGMAX,INDIC)
      RETURN
      END
C **********************************************
C **********************************************
      SUBROUTINE POLYANCOEFX (DEG,P2,DEGDEB,DEGMAX,N,P,INDIC,SEQ)
C ** TROUVE, S'IL EXISTE, UN POLYNOME P2, DE DEGRE MAXIMAL DEGMAX,
C ** COMMENCANT PAR LE TERME DE DEGRE DEGDEB, CONTENANT
C ** EXACTEMENT N TERMES NON NULS AUTRES QUE LE TERME CONSTANT, TOUJOURS
C ** SUPPOSE EGAL A 1, ET QUI EST UN MULTIPLE DU POLYNOME P.LE POLYNOME Q
C                                         m    n
C ** EST LE MULTIPLICATEUR.EXEMPLE, SI N=2:  1+Z + Z = P Q    m,n, A TROUVER.
C*********
C*********** FINDS, IF IT EXISTS, A POLYNOMIAL P2, THE NON CONSTANT TERMS OF
C ** WHICH ARE BETWEEN DEGDEB AND DEGMAX (INCLUDED), HAVING EXACTLY N NON
C ** CONSTANT TERMS AND MULTIPLE OF P. IN FACT, WE USE THE P.N.S. SEQ GENERATED
C ** BY P TO TEST THAT P2 IS A GENERATOR OF SEQ.
C                     m   n
C ** EXAMPLE, IF N=2 :  1+Z + Z   = P Q    m,n, to be found.
      INTEGER DEG,DEGDEB,DEGMAX,N
      INTEGER P (1),P2(1),SEQ(1)
      INTEGER R (256),Q(256)
      INTEGER INDICE (6)          !POSITIONS OF THE INDICES.
      CALL DEGRE (P,DEG,IDEGP,INDICD)
      NMAX=2**IDEGP-1         !PERIOD OF THE P.N.S.
      INDIC=0                 !INDIC=1 EN CAS DE SUCCES.
      IDEP=DEGDEB             !DEGDEB=m . THE FIRST POSITION WILL BE m+1
      DO 10 II=1,N            !THE N TERMS ARE POSITIONNED BLOCKED TOGETHER, STARTING
C                             !FROM DEGDEB. THEY WILL BE MOVED AFTER EACH TEST.
      INDICE(II)=IDEP+II      ! INDICE(II) IS THE POSITION OF TERM II
```

```
10      CONTINUE        !
100     CONTINUE        !RETURN POINT
        CALL PUNIT (DEG,P2)    !CREATES THE UNITY POLYN.
        DO 120 II=1,N
        P2(INDICE(II))=1       !PUTS THE NON CONSTANT TERMS A THEIR PLACES
                               !IN THE POLYNOMIAL
120     CONTINUE
C ************************************ TEST ************
C ***** LOOKS TO SEE IF THE POLYN. IS A GENERATOR OF SEQ.
        DO 2100 IECH=1+DEGMAX,NMAX+DEGMAX   ! IECH IS THE RANK OF ONE BIT
        ITEST=SEQ (IECH)                    ! OF THE P.N.S. SEQ
        DO 2000 II=1,N
        ITEST = ITEST.XOR.SEQ(IECH-INDICE(II)+1)
2000    CONTINUE
        IF (ITEST.NE.0) GO TO 2200    ! INTERRUPTS THE TEST AS SOON AS A
C                                     ! DISCREPANCY APPEARS.
2100    CONTINUE
        GO TO 1000      !SUCCESS!!!
C ** SINON, ON ESSAIE DE DECALER LES INDICES
C ** IF NO SUCCESS, THE TERMS OF THE POLYN. ARE SHIFTED
2200    CONTINUE
C ******************** END OF TEST **********************
        DO 200 II=1,N-1
        IF (INDICE(II).LT.INDICE(II+1)-1) THEN  !THERE IS ROOM TO SHIFT THE TERM
        INDICE (II)=INDICE(II)+1                !IT IS DONE
        DO 230 LL=1,II-1           ! PRECEEDING TERMS ARE PLACED AGAIN AT THE
230     INDICE(LL)=LL+IDEP         ! BEGINNING
        GO TO 100                                !TO THE TEST
        END IF
200     CONTINUE        ! WHEN HERE, ALL TERMS ARE BLOCKED AGAINST THE
C                       ! NTH TERM, WHICH MUST BE SHIFTED
        INDICE(N)=INDICE(N)+1      ! TERM N IS SHIFTED
C ****** FIN
        IF (INDICE(N).GT.DEGMAX+1) THEN !STOP!.N GREATER THAN DEGMAX
        INDIC=0         !NO SUCCESS AT ALL.EXIT
        GO TO 10000
        END IF
C *************************
        DO 210 LL=1,N-1 !OTHER TERMS ARE PLACED AGAIN AT THE BEGINNING
        INDICE(LL)=IDEP+LL
210     CONTINUE
        GO TO 100       !TO THE RETURN POINT
1000    CONTINUE        !SUCCESS!!!!
        INDIC=1
10000   CONTINUE
        RETURN
        END
C ******************************************************
```

Having described the invention, what is claimed is:

1. A parallel pseudo-random generator for emulating a serial pseudo-random generator that generates serial outputs at a frequency based upon a clock signal, such that the next serial output value is based upon an Exclusive OR combination of at least two preceding serial output values, the maximum preceding serial output value defined as the Pth preceding serial output value, where P is an integer greater than one; comprising:

A) W latches, where W is an integer equal to or greater than P, each latch having an output having a logic value 1 or 0, the latched outputs designated $Q0$ to $Q(W-1)$, each output for each latch i, where i is an integer from 0 to $W-1$, representing the next time sequential output of the serial pseudo-random generator so that the parallel composite latch outputs $Q0$ to $Q(W-1)$ are the same as the serial pseudo-random generator output sequence for W successive outputs, each latch also having an input operated upon receipt of a clock signal for receipt of data for controlling the next logic value on the latch output, said clock signal having a frequency less than the frequency of the emulated serial pseudo-random generator clock signal;

B) W Exclusive OR gates, each having at least two inputs and one output, each Exclusive OR gate output connected to a corresponding input of one latch so as to define the next value of the latch output upon receipt of the next clock signal; and C) means for connecting each input of each Exclusive OR gate to one latch output Qi so that the output of each Exclusive OR gate represents the corresponding next value of the latch to which this Exclusive OR gate output is connected.

2. A parallel pseudo-random generator as defined in claim 1, wherein the serial Exclusive OR combination defining the serial pseudo-random generator combines the sixth and seventh preceding serial output, wherein the number of latches is sixteen, the latches having corresponding outputs Q0 through Q15, and the width of the pseudo-random generator is equal to 16 and further wherein the corresponding sixteen Exclusive OR gates Ex0-Ex15 each have their output connected to the corresponding latch input, and have their inputs connected to the following latch outputs:

Ex0 inputs connected to Q8 and Q12
Ex1 inputs connected to Q9 and Q13
Ex2 inputs connected to Q10 and Q14
Ex3 inputs connected to Q11 and Q15
Ex4 inputs connected to Q0 and Q2
Ex5 inputs connected to Q1 and Q3
Ex6 inputs connected to Q2 and Q4
Ex7 inputs connected to Q3 and Q5
Ex8 inputs connected to Q4 and Q6
Ex9 inputs connected to Q5 and Q7
Ex10 inputs connected to Q0 and Q1
Ex11 inputs connected to Q1 and Q2
Ex12 inputs connected to Q2 and Q3
Ex13 inputs connected to Q3 and Q4
Ex14 inputs connected to Q4 and Q5
Ex15 inputs connected to Q5 and Q6.

3. A parallel pseudo-random generator for emulating a serial pseudo-random generator that generates serial outputs such that the next serial output value is based upon an Exclusive OR combination of the sixth and seventh preceding serial output values, the maximum preceding serial output value defined as the Pth preceding serial output value, where P is an integer equal to seven; comprising:
A) W latches, where W is an integer equal to or greater than P, each latch having an output having a logic value 1 or 0, the latched outputs designated Q0 to Q(W−1), each output for each latch i, where i is an integer from 0 to W−1, representing the next time sequential output of the serial pseudo-random generator so that the parallel composite latch outputs Q0 to Q(W−1) are the same as the serial pseudo-random generator output sequence for W successive outputs, each latch also having an input operated upon receipt of a clock signal for receipt of data for controlling the next logic value on the latch output;
B) W Exclusive OR gates, each having at least two inputs and one output, each Exclusive OR gate output connected to a corresponding input of one latch so as to define the next value of the latch output upon receipt of the next clock signal; and
C) means for connecting each input of each Exclusive OR gate to one latch output Qi so that the output of each Exclusive OR gate represents the corresponding next value of the latch to which this Exclusive OR gate output is connected.

4. A parallel pseudo-random generator as defined in claim 3, wherein the number of latches is eight, the latches having corresponding outputs Q0 through Q7, and wherein the corresponding Exclusive OR gates Ex0-Ex7 each have their output connected to the corresponding latch input, and have their inputs connected to the following latch outputs:

Ex0 inputs connected to Q4 and Q6
Ex1 inputs connected to Q5 and Q7
Ex2 inputs connected to Q0 and Q1
Ex3 inputs connected to Q1 and Q2
Ex4 inputs connected to Q2 and Q3
Ex5 inputs connected to Q3 and Q4
Ex6 inputs connected to Q4 and Q5
Ex7 inputs connected to Q5 and Q6.

5. A parallel pseudo-random generator for emulating a serial pseudo-random generator that generates serial outputs such that the next serial output value is based upon an Exclusive OR combination of at least two preceding serial output values, the maximum preceding serial output value defined as the Pth preceding serial output value, where P is an integer greater than one; said Exclusive OR combination defined by a polynomial of the form $1+x^M+ \ldots +x^P$, where M is a positive integer less than P, so that any stage "n" of the serial pseudo-random generator, where n is an integer, is defined by the identity $Q(n) \equiv Q(n+M) + \ldots + Q(n+P)$ comprising:
A) W latches, where N is an integer equal to or greater than P, each latch having an output having a logic value 1 or 0, the latched outputs designated to Q0 to Q(W−1), each output for each latch i, where i is an integer from 0 to W−1, representing the next film sequential output of the serial pseudo-random generator so that the parallel composite latch outputs Q0 to Q(W−1) are the same as the serial pseudo random generator output sequence for W successive outputs, each latch also having an input operated upon receipt of a clock signal for receipt of data for controlling the next logic value on the latch output;
B) W Exclusive OR gates, each having at least two inputs and one output, each Exclusive OR gate output connected to a corresponding input of one latch so as to define the next value of the latch output upon receipt of the next clock signal; and
C) means for connecting each input of each Exclusive OR gate to one latch output Qi so that the output of each Exclusive OR gate represents the corresponding next value of the latch to which this Exclusive OR gate output is connected, wherein said means comprises determination of the relationship of each next output Qi based upon the present outputs Q0 through Q(W−1) by determining the relationship of Q(i−W), which is equivalent to the next output of Qi, and then successively applying the serial pseudo-random generator identity for a value of n equal to i−W until the righthand portion on the identity only represents latch outputs from the group of latch output comprising Q0 to Q(W−1).

6. A parallel pseudo-random generator as defined in claim 5, further wherein the means for connecting each input of each Exclusive OR gate to one latch output Qi comprises elimination of Exclusive OR combinations of the type Qj+Qj, for any integer value of j from 0 to W−1.

7. A parallel pseudo-random generator for emulating a serial pseudo-random generator that generates serial outputs such that the next serial output value is based upon an Exclusive OR combination of the sixth and seventh preceding serial output values, comprising:
A) eight latches, each latch having an output having a logic value 1 or 0, the latch outputs designated Q0 to Q7, each latch also having an input operated upon receipt of a clock signal for receipt of data for controlling the next logic value of the latch output;

B) eight Exclusive OR gates designated Ex0 to Ex7, each having at least two inputs and one output, each Exclusive OR gate output connected to a corresponding input of one latch so as to define the next value of the latch output upon receipt of the next clock signal; and C) means for connecting each input of each Exclusive OR gate, Ex0 through Ex7, to one latch output so that the output of each Exclusive OR gate represents the corresponding next value of the latch to which this Exclusive OR gate output is connected, and specifically wherein the inputs are connected to the following latch outputs:
Ex0 inputs connected to Q4 and Q6
Ex1 inputs connected to Q5 and Q7
Ex2 inputs connected to Q0 and Q1
Ex3 inputs connected to Q1 and Q2
Ex4 inputs connected to Q2 and Q3
Ex5 inputs connected to Q3 and Q4
Ex6 inputs connected to Q4 and Q5
Ex7 inputs connected to Q5 and A6.

8. A parallel pseudo-random generator for emulating a serial pseudo-random generator that generates serial outputs such that the next serial output value is based upon an Exclusive OR combination of the sixth and seventh preceding serial output values, comprising:

A) sixteen latches, each latch having an output having a logic value 1 or 0, the latch outputs designated Q0 to Q15, each latch also having an input operated upon receipt of a clock signal for receipt of data for controlling the next logic value of the latch output;

B) sixteen Exclusive OR gates designated Ex0 to Ex15, each having at least two inputs and one output, each Exclusive OR gate output connected to a corresponding input of one latch so as to define the next value of the latch output upon receipt of the next clock signal; and C) means for connecting each input of each Exclusive OR gate Ex0 through Ex15, to one latch output so that the output of each Exclusive OR gate represents the corresponding next value of the latch to which this Exclusive OR gate output is connected, and specifically wherein the inputs are connected to the following latch outputs:
Ex0 inputs connected to Q8 and Q12
Ex1 inputs connected to Q9 and Q13
Ex2 inputs connected to Q10 and Q14
Ex3 inputs connected to Q11 and Q15
Ex4 inputs connected to Q0 and Q2
Ex5 inputs connected to Q1 and Q3
Ex6 inputs connected to Q2 and Q4
Ex7 inputs connected to Q3 and Q5
Ex8 inputs connected to Q4 and Q6
Ex9 inputs connected to Q5 and Q7
Ex10 inputs connected to Q0 and Q1
Ex11 inputs connected to Q1 and Q2
Ex12 inputs connected to Q2 and Q3
Ex13 inputs connected to Q3 and Q4
Ex14 inputs connected to Q4 and Q5
Ex15 inputs connected to Q5 and Q6.

9. A parallel pseudo-random generator for emulating a serial pseudo-random generator that generates serial outputs at a frequency based upon a clock signal, such that the next serial output value is based upon an Exclusive OR combination of at least two preceding serial output values, the maximum preceding serial output value defined as the Pth preceding serial output value, where P is an integer greater than one; comprising:

A) W latches, where W is an integer greater than P, each latch having an output having a logic value 1 or 0, the latched outputs designated Q0 to $Q(W-1)$, each output for each latch i, where i is an integer from 0 to $W-1$, representing the next time sequential output of the serial pseudo-random generator so that the parallel composite latch outputs Q0 to $Q(W-1)$ are the same as the serial pseudo-random generator output sequence for W successive outputs, each latch also having an input operated upon receipt of a clock signal for receipt of data for controlling the next logic value on the latch output, said clock signal having a frequency less than the frequency of the emulated serial pseudo-random generator clock signal;

B) W Exclusive OR gates, each having at least two inputs and one output, each Exclusive OR gate output connected to a corresponding input of one latch so as to define the next value of the latch output upon receipt of the next clock signal; and C) means for connecting each input of each Exclusive OR gate to one latch output Qi so that the output of each Exclusive OR gate represents the corresponding next value of the latch to which this Exclusive OR gate output is connected.

10. A parallel pseudo-random generator for emulating a serial pseudo-random generator that generates serial outputs such that the next serial output value is based upon an Exclusive OR combination of the sixth and seventh preceding serial output values, the maximum preceding serial output value defined as the Pth preceding serial output value, where P is an integer equal to seven; comprising:

A) W latches, where W is an integer greater than P, each latch having an output having a logic value 1 or 0, the latched outputs designated Q0 to $Q(W-1)$, each output for each latch i, where i is an integer from 0 to $W-1$, representing the next time sequential output of the serial pseudo-random generator so that the parallel composite latch outputs Q0 to $Q(W-1)$ are the same as the serial pseudo-random generator output sequence for W successive outputs, each latch also having an input operated upon receipt of a clock signal for receipt of data for controlling the next logic value on the latch output;

B) W Exclusive OR gates, each having at least two inputs and one output, each Exclusive OR gate output connected to a corresponding input of one latch so as to define the next value of the latch output upon receipt of the next clock signal; and C) means for connecting each input of each Exclusive OR gate to one latch output Qi so that the output of each Exclusive OR gate represents the corresponding next value of the latch to which this Exclusive OR gate output is connected.

11. A parallel pseudo-random generator for emulating a serial pseudo-random generator that generates serial outputs such that the next serial output value is based upon an Exclusive OR combination of at least two preceding serial output values, the maximum preceding serial output value defined as the Pth preceding serial output value, where P is an integer greater than one; said Exclusive OR combination defined by a polynomial of the form $1+x^M+ \ldots +x^P$, where M is a positive integer less than P, so that any stage "n" of the serial pseudo-random generator, where n is an integer, is defined by the identity $Q(n) \equiv Q(n+M) + \ldots + Q(n+P)$, comprising:

A) W latches, where W is an integer equal to or greater than P, each latch having an output having a logic value 1 or 0, the latched outputs designated Q0 to Q(W−1), each output for each latch i, where i is an integer from 0 to W−1, representing the next time sequential output of the serial pseudo-random generator so that the parallel composite latch outputs Q0 to Q(W−1) are the same as the serial pseudo-random generator output sequence for W successive outputs, each latch also having an input operated upon receipt of a clock signal for receipt of data for controlling the next logic value on the latch output;

B) W Exclusive OR gates, each having at least two inputs and one output, each Exclusive OR gate output connected to a corresponding input of one latch so as to define the next value of the latch output upon receipt of the next clock signal; and C) means for connecting each input of each Exclusive OR gate to one latch output Qi so that the output of each Exclusive OR gate represents the corresponding next value of the latch to which this Exclusive OR gate output is connected, wherein said means comprises determination of the relationship of each next output Qi based upon the present outputs Q0 through Q(W−1) by determining the relationship of Q(i−W), which is equivalent to the next output of Qi, and then successively applying the serial pseudo-random generator identity for a value of n equal to i−W until the righthand portion of the identity only represents latch outputs from the group of latch outputs comprising Q0 to Q(W−1).

12. A parallel pseudo-random generator scrambler for emulating a serial pseudo-random generator scrambler that incorporates a serial pseudo-random generator that generates serial outputs such that the next serial output value is based upon an Exclusive OR combination of at least two preceding serial output values, the maximum preceding serial output value defined as the Pth preceding serial output value, where P is an integer greater than one, wherein the next serial output value is defined by a polynomial of the form $1 + x^M + \ldots + x^P$, where M is a positive integer less than P, so that any stage "n" of the serial pseudo-random generator, where n is an integer, is defined by the identity $Q(n) \equiv Q(n+M) + \ldots + Q(n+P)$, the parallel pseudo-random scrambler for pseudo-random scrambling the data on W parallel data lines, where W is an integer equal to or greater than P, comprising:

A) W latches, each latch having an output having a logic value 1 or 0, the latched outputs designated Q0 to Q(W−1), each output for each latch i, where i is an integer from 0 to W−1, representing the next time sequential output of the serial pseudo-random generator so that the parallel composite latch outputs Q0 to Q(W−1) are the same as the serial pseudo-random generator output sequence for W successive outputs, each latch also having an input operated upon receipt of a clock signal for receipt of data for controlling the next logic value on the latch output;

B) W Exclusive OR gates, each having at least two inputs and one output, each Exclusive OR gate output connected to a corresponding input of one latch so as to define the next value of the latch output upon receipt of the next clock signal;

C) means for connecting each input of each Exclusive OR gate to one latch output Qi so that the output of each Exclusive OR gate represents the corresponding next value of the latch to which this Exclusive OR gate output is connected, wherein said means comprises determination of the relationship of each next output Qi based upon the present outputs Q0 through Q(W−1) by determining the relationship of Q(i−W), which is equivalent to the next output of Qi, and then successively applying the serial pseudo-random generator identity for a value of n equal to i−W until the righthand portion of the identity only represents latch outputs from the group of latch outputs comprising Q0 to Q(W−1); and D) a second set of W Exclusive OR gates each having one input connected to one latch output and a second input connected to one of the W data lines, the output of each said Exclusive OR gate representing the pseudo-random scrambled version of the data on the corresponding data line.

13. A parallel pseudo-random generator scrambler as defined in claim 12, wherein the serial Exclusive OR combination defining the serial pseudo-random generator determines its next output value based upon the sixth and seventh preceding serial output values (P=7).

14. A parallel pseudo-random generator scrambler as defined in claim 13, wherein the number of latches is eight, the latches having corresponding outputs Q0 through Q7, and wherein the corresponding Exclusive OR gates Ex0–Ex7 each have their output connected to the corresponding latch input, and have their inputs connected to the following latch outputs:

Ex0 inputs connected to Q4 and Q6
Ex1 inputs connected to Q5 and Q7
Ex2 inputs connected to Q0 and Q1
Ex3 inputs connected to Q1 and Q2
Ex4 inputs connected to Q2 and Q3
Ex5 inputs connected to Q3 and Q4
Ex6 inputs connected to Q4 and Q5
Ex7 inputs connected to Q5 and Q6.

15. A parallel pseudo-random generator scrambler as defined in claim 12, wherein the serial Exclusive OR combination defining the serial pseudo-random generator combines the sixth and seventh preceding serial output, wherein the number of latches is sixteen, the latches having corresponding outputs Q0 through Q15, and wherein the corresponding sixteen Exclusive OR gates Ex0–Ex15 each have their output connected to the corresponding latch input, and have their inputs connected to the following latch outputs:

Ex0 inputs connected to Q8 and Q12
Ex1 inputs connected to Q9 and Q13
Ex2 inputs connected to Q10 and Q14
Ex3 inputs connected to Q11 and Q15
Ex4 inputs connected to Q0 and Q2
Ex5 inputs connected to Q1 and Q3
Ex6 inputs connected to Q2 and Q4
Ex7 inputs connected to Q3 and Q5
Ex8 inputs connected to Q4 and Q6
Ex9 inputs connected to Q5 and Q7
Ex10 inputs connected to Q0 and Q1
Ex11 inputs connected to Q1 and Q2
Ex12 inputs connected to Q2 and Q3
Ex13 inputs connected to Q3 and Q4
Ex14 inputs connected to Q4 and Q5

Ex15 inputs connected to Q5 and Q6.

16. A parallel pseudo-random generator scrambler for emulating a serial pseudo-random generator scrambler that incorporates a serial pseudo-random generator that generates serial outputs such that the next serial output value is based upon an Exclusive OR combination of at least two preceding serial output values, the maximum preceding serial output value defined as the Pth preceding serial output value, where P is an integer greater than one, the parallel pseudo-random scrambler for pseudo-random scrambling the data on W parallel data lines, where W is an integer equal to or greater than P comprising:
  A) W latches, each latch having an output having a logic value 1 or 0, the latched outputs designated Q0 to Q(W−1), each output for each latch i, where i is an integer from 0 to W−1, representing the next time sequential output of the serial pseudo-random generator so that the parallel composite latch outputs Q0 to Q(W−1) are the same as the serial pseudo-random generator output sequence for W successive outputs, each latch also having an input operated upon receipt of a clock signal for receipt of data for controlling the next logic value on the latch output;
  B) W Exclusive OR gates, each having at least two inputs and one output, each Exclusive OR gate output connected to a corresponding input of one latch so as to define the next value of the latch output upon receipt of the next clock signal;
  C) means for connecting each input of each Exclusive OR gate to one latch output Qi so that the output of each Exclusive OR gate represents the corresponding next value of the latch to which this Exclusive OR gate output is connected; and
  D) a second set of W Exclusive OR gates each having one input connected to one latch output and a second input connected to one of the W data lines, the output of each said Exclusive OR gate representing the pseudo-random scrambled version of the data on the corresponding data line.

17. A parallel pseudo-random generator scrambler as defined in claim 16, wherein the serial Exclusive OR combination defining the serial pseudo-random generator determines its next output value based upon the sixth and seventh preceding serial output values (P=7).

18. A parallel pseudo-random generator scrambler as defined in claim 17, wherein the number of latches is eight, the latches having corresponding outputs Q0 through Q7, and wherein the corresponding Exclusive OR gates Ex0–Ex7 each have their output connected to the corresponding latch input, and have their inputs connected to the following latch outputs:
  Ex0 inputs connected to Q4 and Q6
  Ex1 inputs connected to Q5 and Q7
  Ex2 inputs connected to Q0 and Q1
  Ex3 inputs connected to Q1 and Q2
  Ex4 inputs connected to Q2 and Q3
  Ex5 inputs connected to Q3 and Q4
  Ex6 inputs connected to Q4 and Q5
  Ex7 inputs connected to Q5 and Q6.

19. A parallel pseudo-random generator scrambler as defined in claim 16, wherein the serial Exclusive OR combination defining the serial pseudo-random generator combines the sixth and seventh preceding serial output, wherein the number of latches is sixteen, the latches having corresponding outputs Q0 through Q15, and further wherein the corresponding sixteen Exclusive OR gates Ex0–Ex15 each have their output connected to the corresponding latch input, and have their inputs connected to the following latch outputs:
  Ex0 inputs connected to Q8 and Q12
  Ex1 inputs connected to Q9 and Q13
  Ex2 inputs connected to Q10 and Q14
  Ex3 inputs connected to Q11 and Q15
  Ex4 inputs connected to Q0 and Q2
  Ex5 inputs connected to Q1 and Q3
  Ex6 inputs connected to Q2 and Q4
  Ex7 inputs connected to Q3 and Q5
  Ex8 inputs connected to Q4 and Q6
  Ex9 inputs connected to Q5 and Q7
  Ex10 inputs connected to Q0 and Q1
  Ex11 inputs connected to Q1 and Q2
  Ex12 inputs connected to Q2 and Q3
  Ex13 inputs connected to Q3 and Q4
  Ex14 inputs connected to Q4 and Q5
  Ex15 inputs connected to Q5 and Q6.

20. A parallel pseudo-random generator which emulates a serial pseudo-random generator that generates serial outputs at a frequency based upon a clock signal, such that the next serial output is based upon an Exclusive OR combination of at least two preceding serial output values, the maximum preceding serial output value defined as the Pth preceding serial output value, where P is an integer greater than 1, such that the next serial output value is defined by a polynomial of the form $1+x^M+ \ldots +x^P$, where M is a positive integer less than P, so that any stage "n" of the serial pseudo-random generator, where n is an integer, is defined by the identity $Q(n) \equiv Q(n+M)+ \ldots +Q(n+P)$, the parallel pseudo-random generator having W latches, where W is an integer equal to or greater than P, each latch having an output having a logic value 1 or 0, the latched outputs designated Q0 to Q(W−1), each output for each latch i, where i is an integer from 0 to W−1, representing the next time sequential output of the serial pseudo-random generator so that the parallel composite latch outputs Q0 to Q(W−1) are the same as the serial pseudo-random generator output sequence for W successive outputs, each latch also having an input operated upon receipt of a clock signal for receipt of data for controlling the next logic value on the latch output, said clock signal having a frequency less than the frequency of the emulated serial pseudo-random generator clock signal, W Exclusive OR gates, each having at least two inputs and one output, each Exclusive OR gate output connected to a corresponding input of one latch so as to define the next value of the latch output upon receipt of the next clock signal, and means for connecting each input of each Exclusive OR gate to one latch output Qi so that the output of each Exclusive OR gate represents the corresponding next value of the latch to which this Exclusive OR gate output is connected; wherein the means for connecting each input of each Exclusive OR gate to one latch output Qi comprises the steps of:
  1) determining the relationship of each next output Qi, where i is an integer from 0 to W−1, based upon the present outputs Q0 through Q(W−1), by determining the relationship defining the output Q(i−W), which is equivalent to the next output of Qi,
  2) determining the relationship of Q(i−W) by successively applying the serial pseudo-random generator identity for a value of n equal to i−W until the righthand portion of the identity only represents latch outputs from the group of latch outputs comprising Q0 to Q(W−1).

* * * * *

UNITED STATES PATENT AND TRADEMARK OFFICE
CERTIFICATE OF CORRECTION

PATENT NO. : 5,031,129
DATED : July 9, 1991
INVENTOR(S) : Powell et al

It is certified that error appears in the above-identified patent and that said Letters Patent is hereby corrected as shown below:

At column 40, line 21, please delete "N" and insert --W--; and at line 26, please delete "film" and insert --time--.

Signed and Sealed this

Sixth Day of October, 1992

Attest:

DOUGLAS B. COMER

*Attesting Officer*   Acting Commissioner of Patents and Trademarks